(12) United States Patent
Nakano et al.

(10) Patent No.: US 6,397,312 B1
(45) Date of Patent: May 28, 2002

(54) MEMORY SUBSYSTEM OPERATED IN SYNCHRONISM WITH A CLOCK

(75) Inventors: Masao Nakano; Hiroyoshi Tomita; Kotoku Sato; Yoshihiro Takemae; Masao Taguchi, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 08/970,086

(22) Filed: Nov. 13, 1997

(30) Foreign Application Priority Data

Jul. 4, 1997 (JP) .............................................. 9-179969

(51) Int. Cl.⁷ ............................................. G06F 12/00
(52) U.S. Cl. ...................... 711/167; 711/154; 711/105; 713/400; 713/401; 365/193; 365/194
(58) Field of Search ................................ 711/167, 105, 711/104, 154; 713/400, 401; 365/193, 194

(56) References Cited

U.S. PATENT DOCUMENTS

| | | | | |
|---|---|---|---|---|
| 4,332,028 A | * | 5/1982 | Joccotton et al. .............. 371/21 |
| 4,956,804 A | * | 9/1990 | Matsumoto ................... 364/900 |
| 5,239,639 A | * | 8/1993 | Fischer et al. ............... 364/200 |
| 5,278,974 A | * | 1/1994 | Lemmon ..................... 395/550 |
| 5,479,647 A | * | 12/1995 | Harness et al. .............. 395/550 |
| 5,572,722 A | * | 11/1996 | Vogley ........................ 395/555 |
| 5,577,236 A | * | 11/1996 | Johnson et al. .............. 395/551 |
| 5,608,896 A | * | 3/1997 | Vogley ........................ 395/558 |
| 5,615,355 A | * | 3/1997 | Wagner ....................... 395/494 |
| 5,623,638 A | * | 4/1997 | Andrade ...................... 395/494 |
| 5,692,165 A | * | 11/1997 | Jeddeloh et al. ............. 395/551 |
| 5,815,016 A | * | 9/1998 | Erickson ..................... 327/158 |
| 5,835,956 A | * | 11/1998 | Park et al. ................... 711/167 |
| 5,857,095 A | * | 1/1999 | Jeddeloh et al. ............. 395/552 |
| 5,886,948 A | * | 3/1999 | Ryan .......................... 365/233 |
| 5,896,347 A | | 4/1999 | Tomita et al. |
| 5,923,613 A | * | 7/1999 | Tien et al. ................... 365/233 |
| 5,940,328 A | * | 8/1999 | Iwamoto et al. ........ 365/189.01 |
| 5,946,268 A | * | 8/1999 | Iwamoto et al. ............. 365/233 |
| 5,946,712 A | * | 8/1999 | Lu et al. ...................... 711/167 |
| 5,953,286 A | * | 9/1999 | Matsubara et al. .......... 365/233 |
| 5,987,576 A | * | 11/1999 | Johnson et al. .............. 711/167 |
| 5,987,619 A | * | 11/1999 | Hamamoto et al. .......... 713/401 |
| 6,003,118 A | * | 12/1999 | Chen .......................... 711/167 |
| 6,016,282 A | * | 1/2000 | Keeth .......................... 365/233 |
| 6,034,878 A | * | 3/2000 | Osaka et al. ................... 365/52 |
| 6,043,694 A | * | 3/2000 | Dortu .......................... 327/156 |
| 6,044,474 A | * | 3/2000 | Klein .......................... 713/400 |
| 6,067,272 A | * | 3/2000 | Foss et al. ................... 365/233 |
| 6,072,743 A | * | 6/2000 | Amano et al. .......... 365/230.03 |
| 6,075,393 A | * | 6/2000 | Tomita et al. ............... 327/153 |
| 6,105,144 A | * | 8/2000 | Wu ............................. 713/401 |
| 6,131,149 A | * | 10/2000 | Lu et al. ...................... 711/167 |
| 6,185,664 B1 | * | 2/2001 | Jeddeloh ..................... 711/167 |

* cited by examiner

*Primary Examiner*—Do Hyun Yoo
*Assistant Examiner*—Kimberly McLean
(74) *Attorney, Agent, or Firm*—Arent Fox Kintner Plotkin & Kahn PLLC

(57) ABSTRACT

A memory system having a simple configuration capable of high-speed data transmission is disclosed. Data is output from a controller or a memory in synchronism with a clock or a data strobe signal. The clock or the data strobe signal is transmitted by a clock signal line or a data strobe signal line, respectively, arranged in parallel to a data signal line. A delay circuit delays by a predetermined time the signals transmitted through the clock signal line or the data strobe signal line. The clock or the data strobe signal thus assumes a phase suitable for retrieval at the destination, so that the data signal can be retrieved directly by means of the received clock or the received data strobe signal.

16 Claims, 18 Drawing Sheets

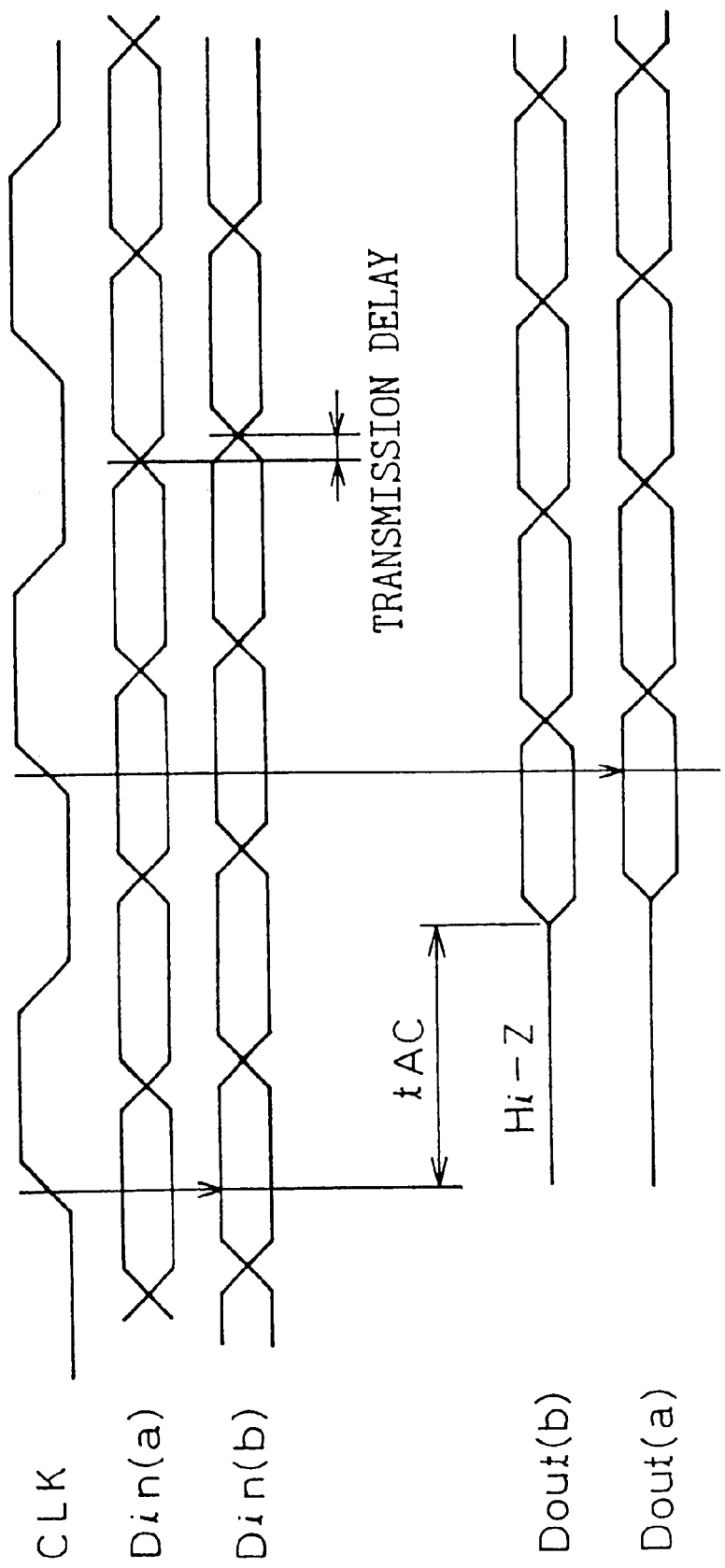

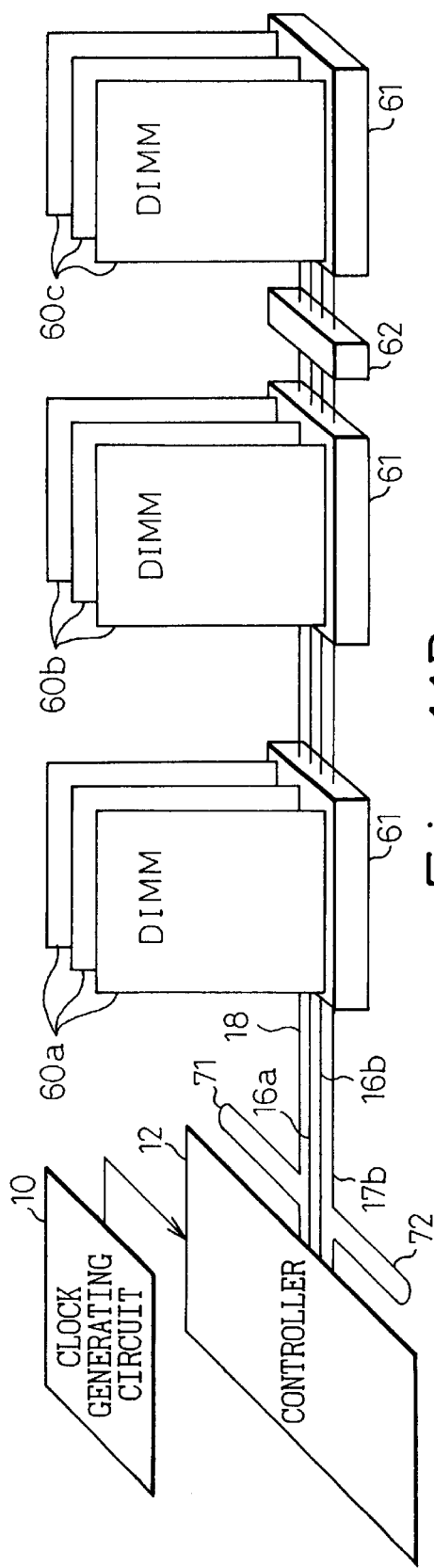
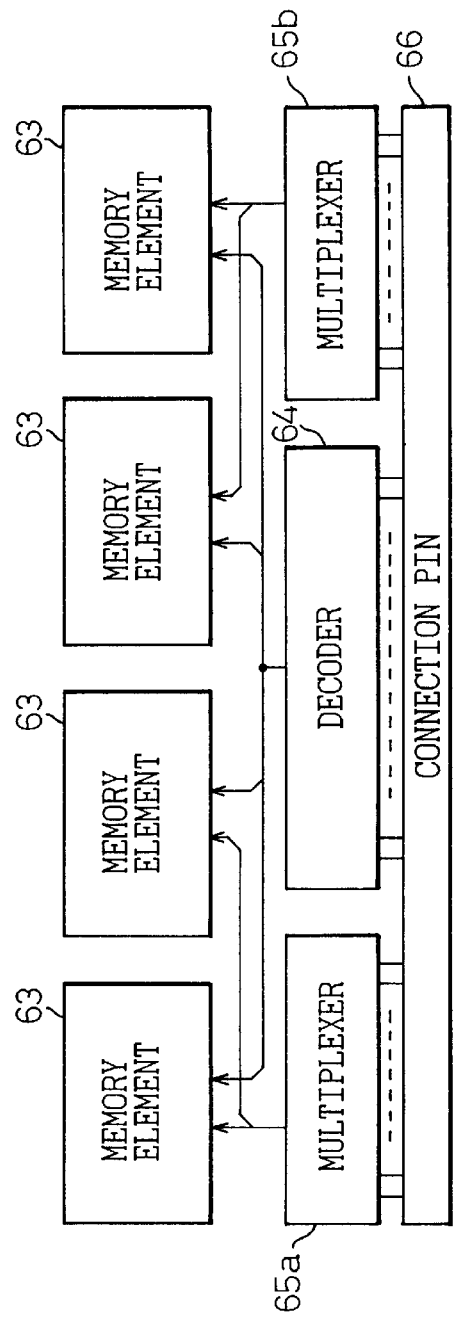
Fig.11A
Fig.11B

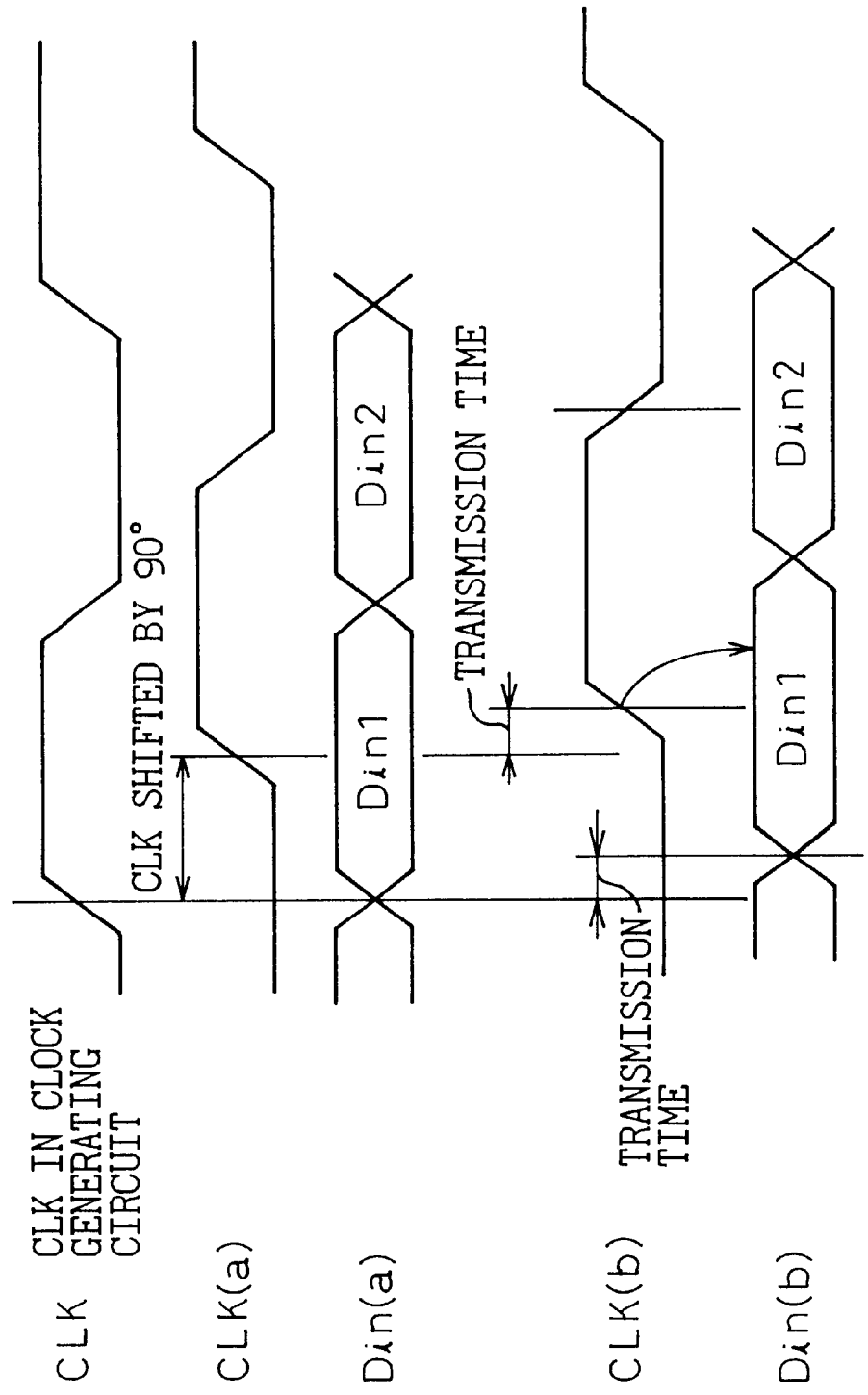

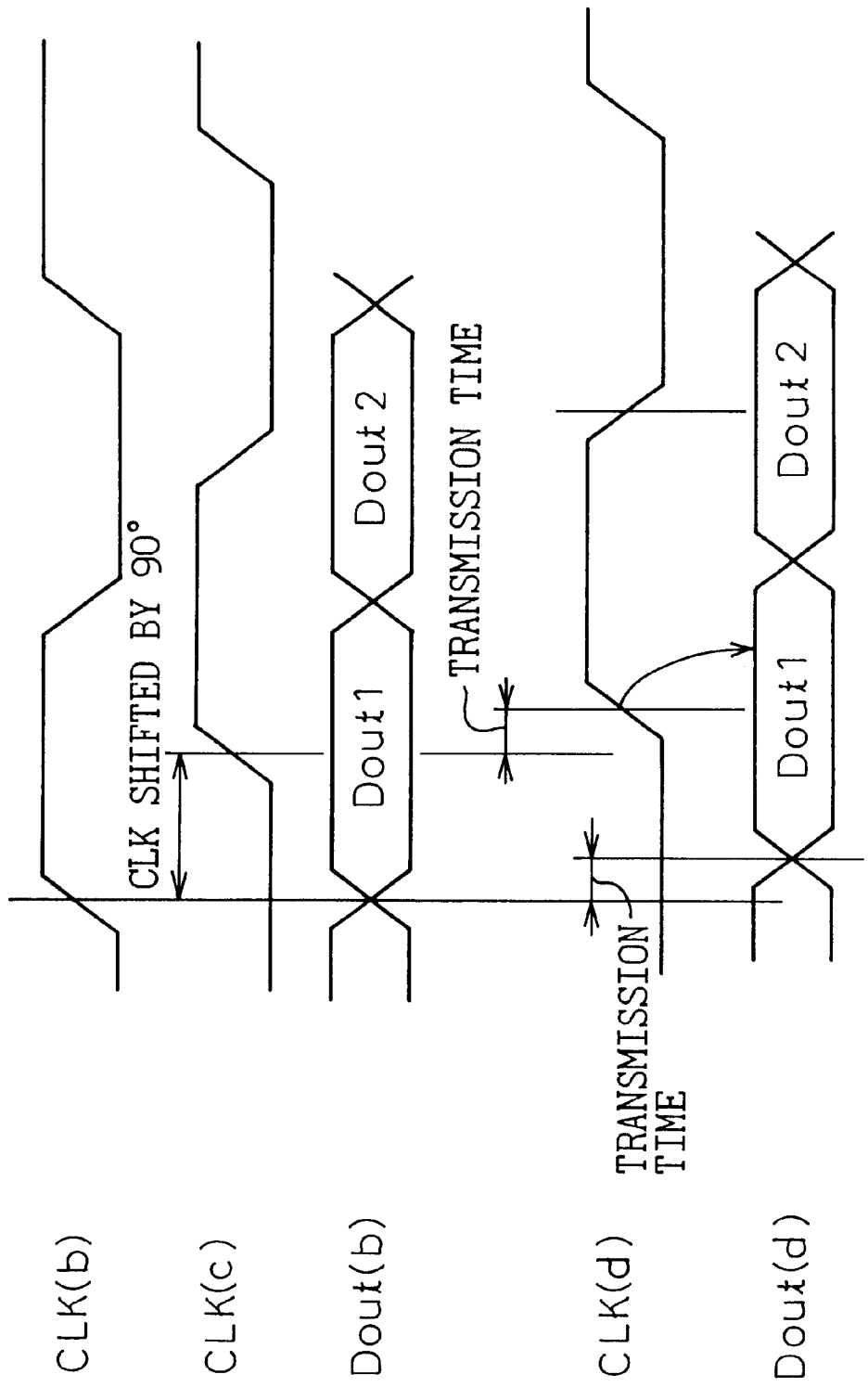

MEMORY SUBSYSTEM OPERATED IN SYNCHRONISM WITH A CLOCK

BACKGROUND OF THE INVENTION

1. Field of the Invention

The present invention relates to a memory subsystem configured of a memory operated in synchronism with a clock or a memory module including a plurality of memories functioning as a large-capacity memory, or more in particular to a memory subsystem capable of high-speed data transfer using a simple mechanism.

2. Description of the Related Art

A large-scale semiconductor device system such as a computer using semiconductor devices is so configured that the parts of the system operate in synchronism with a clock, and signals such as data signals and address signals are input and output in synchronism with a clock. For example, a clock is supplied to each semiconductor device from a clock source through a wiring of equal length. The semiconductor device on the output side outputs a signal in synchronism with an edge of the clock and the semiconductor device at the receiving end receives a signal in synchronism with, an edge of a shift clock shifted by a predetermined amount of phase, or the semiconductor on output side outputs a signal in synchronism with an edge of a shift clock shifted by a predetermined amount of phase and the semiconductor at the receiving end receives a signal at a timing synchronized with an edge of the clock. In either case, however, the signal received by the semiconductor device at the receiving end develops a skew corresponding to the propagation time. As long as the clock frequency is low, the deterioration of the shift clock accuracy due to signal variations or the skew caused by the propagation time pose substantially no problem. With a high clock frequency, however, such phenomena pose a great problem.

Several system configurations for high-speed operation have been suggested for solving these problems. A first scheme, which is called a bidirectional strobe scheme, uses a strobe signal in the transmission in the two directions apart from a clock. A signal line for propagating the data signal to be transmitted and a strobe signal line are installed in parallel. Therefore, substantially no skew is generated and the same phase relation is maintained. In the bidirectional strobe scheme, a strobe signal suitable for retrieval is output in the same direction as the data signal in whichever direction the data signal is transmitted, and therefore the transmission signal can always be retrieved at an optimum timing. Nevertheless, a shift clock generating circuit for generating a shift clock is required of the semiconductor devices at the two ends. In addition, a strobe signal line is required with an input circuit and an output circuit thereof.

A second scheme is called a unidirectional strobe scheme, in which a clock is supplied from a first semiconductor device to a second semiconductor device, and a signal is transmitted from the first semiconductor device to the second semiconductor device in synchronism with the clock, while a signal is transmitted from the second semiconductor device to the first-semiconductor device in synchronism with a strobe signal. In the unidirectional strobe scheme, a transmission signal can be retrieved at an always optimum timing in whichever direction the signal is transmitted.

Both of the above-mentioned conventional schemes make it necessary to generate a shift clock and, in order to generate a signal shifted by an accurately predetermined amount, a DLL (delay locked loop) circuit is used. The DLL circuit, however, is very complicated and large in circuit scale, and requires a large chip area and a large power supply. Provision of this circuit in the semiconductor device, therefore, gives rise to a problem of an increased cost due to a larger chip area and an increased power consumption. Also, the DLL circuit is for producing a desired delay signal by selecting the number of stages of a delay line connected in a multiplicity of stages, and therefore causes a jitter corresponding to one stage of delay. Further, a DLL circuit including a plurality of parallel delay lines arranged with the output of a front line connected to the input of a rear line to produce a desired phase poses the problem that the jitter is magnified by a factor equal to the number of lines arranged. This jitter deteriorates the phase control accuracy and displaces the timing of retrieval, thereby forming a stumbling block to an increased speed.

SUMMARY OF THE INVENTION

The object of the present invention is to realize a memory system capable of high-speed data transmission with a simple configuration.

According to the present invention, in order to achieve the above-mentioned object, there is provided a memory subsystem comprising means for outputting data in synchronism with a clock or a data strobe signal from a controller or a memory and transmitting the clock or the data strobe signal through a clock signal line or a data strobe signal line arranged in parallel with a data signal line, wherein a delay circuit causes a predetermined delay in the clock signal line or the data strobe signal line, so that the clock or the data strobe signal, as the case may be, has a phase suitable for retrieving the data signal and the data signal can be retrieved directly with the received clock or the data strobe signal at the destination. This configuration eliminates the need of the DLL circuit and therefore does not pose the above-mentioned problem. Also, even in the case where data are required to be transmitted and retrieved with reference to both the leading and trailing edges of a clock as when using a DDR-SDRAM, all that is required is to insert a 180° DLL circuit for generating a signal 180° out of phase, and therefore less jitter is generated.

The above-mentioned predetermined delay is the one by which the clock or the data strobe signal comes to have a phase suitable for retrieving the data signal, and represents one half of a minimum transition period of the write data or the read data, or in the case of DDR-SDRAM, a time corresponding to one fourth the clock period.

The delay circuit is realized by a circuit with a long wire to lengthen the signal propagation time through the signal line or by a delay line using a delay element.

The clock signal line is desirably matched in impedance with the data strobe signal line.

The delay circuit is desirably inserted between the controller and the memory. In the event that insertion between the controller and the memory is impossible due to a limited space, the delay circuit can be arranged outside the controller and the memory.

The clock is applied to the clock signal line either from the controller or from the clock source. In the case where the clock is applied from the clock source, the clock to the controller is branched or supplied in parallel. The data strobe signal can be the clock received by the memory. In such a case, the memory changes the read data at the transition edge of the received clock when transmitting the read data, and the data strobe signal line is connected to the clock signal line in the neighborhood of the memory.

Conventionally, a shift clock generating circuit is included in the controller and the memory in order that the clock or the data strobe signal may have a phase suitable for retrieving the transmission data. As a result, the phase cannot be adjusted by lengthening the signal line and a DLL circuit is required. According to the present invention, in contrast, the phase is adjusted outside the chip, and therefore a simple configuration with a lengthened signal line or the like can be used for phase adjustment.

BRIEF DESCRIPTION OF THE DRAWINGS

The present invention will be more clearly understood from the description as set below with reference to the accompanying drawings, wherein:

FIG. 3 is a time chart showing the data input/output operation in the system of FIG. 2;

FIGS. 11A, 11B are diagrams showing a configuration of a memory subsystem according to a first embodiment of the present invention;

FIG. 17 is a time chart showing the write data transmission operation according to the third embodiment; and FIG. 18 is a time chart showing the read data transmission operation according to the third embodiment.

DESCRIPTION OF THE PREFERRED EMBODIMENTS

Before proceeding to a detailed description of the preferred embodiments, a conventional art memory subsystem will be described with reference to the accompanying drawings relating thereto for a clearer understanding of the differences between the conventional art and the present invention.

Figure 1:
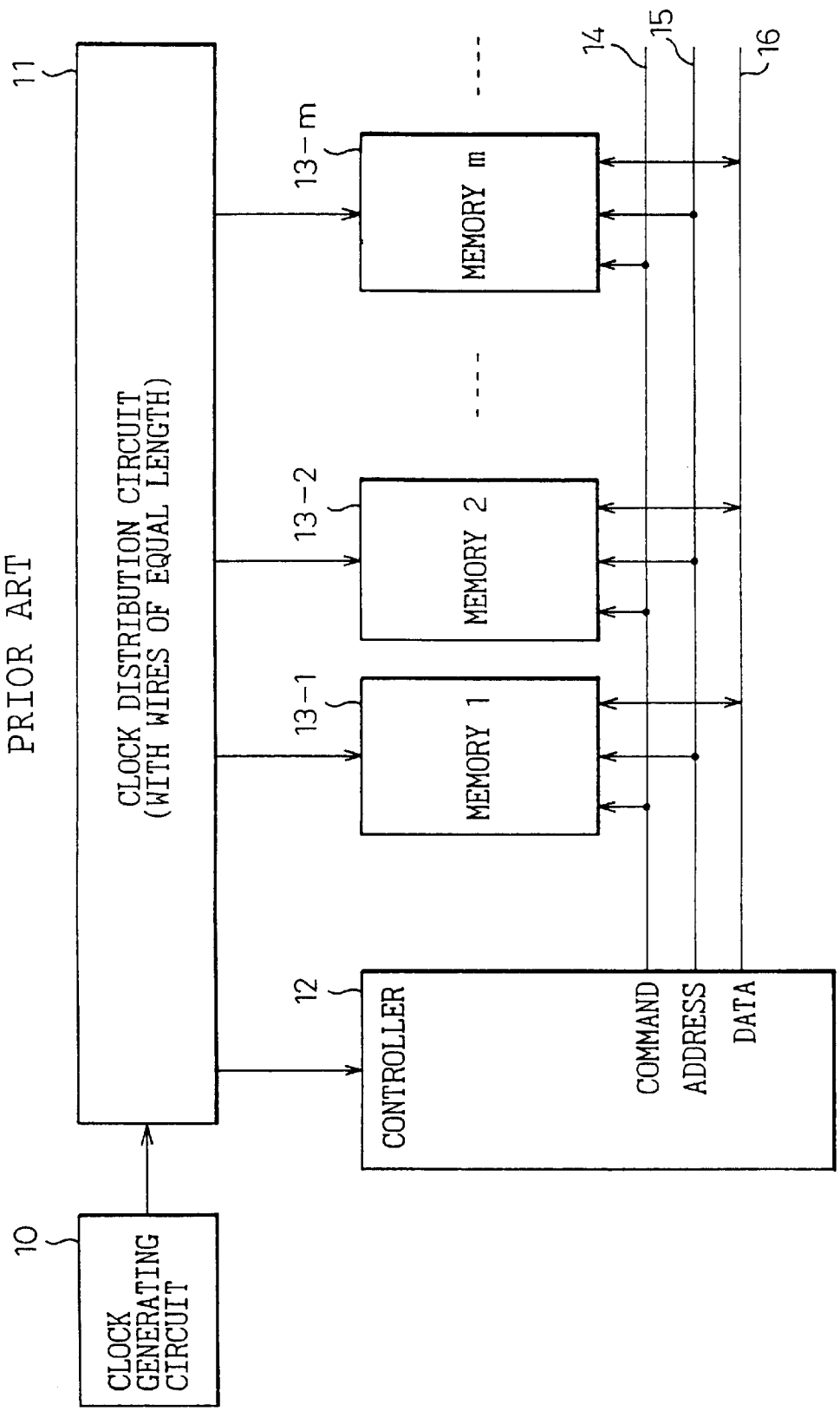
FIG. 1 is a diagram showing a conventional example of a configuration of a memory subsystem.

FIG. 1 is a diagram showing an example of a conventional configuration of a memory subsystem using a memory operating in synchronism with a clock such as a SDRAM. As shown, a control signal bus 14 supplied with a command signal, an address signal bus 15 supplied with an address signal and a data signal bus 16 supplied with a data signal extend from a controller 12. Memories 13-1, 13-2, ..., 13-m are arranged-along these lines, to which each memory is connected. A clock generating circuit 10 is for generating a clock supplied to each element constituting the system. The clock generated in the clock generating circuit 10 is supplied through a clock distribution circuit 11 to the controller 12 and the memories 13-1, 13-2, ..., 13-m. A large-capacity DIMM (dual in-line memory module) including a plurality of memory units and functioning as a memory accessible at high speed, which has come to be used recently, can replace the memories 13-1, 13-2, ..., 13-m.

The clock distribution system 11 shown in FIG. 1 is a circuit having wires of equal length and equal load from the clock generating circuit 10 to the controller 12 and to each of the memories 13-1, 13-2, ..., 13-m so that all the clocks distributed may be in phase with each other.

Figure 2A:
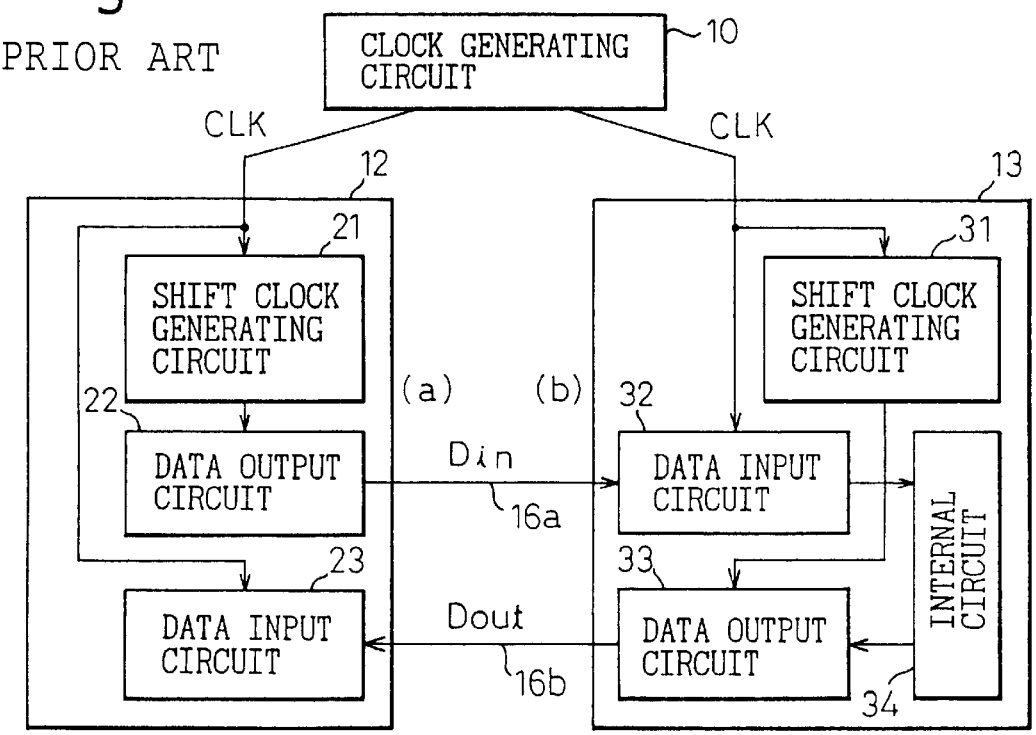
FIGS. 2A, 2B are diagrams showing an example of a conventional configuration for a synchronizing scheme of a memory subsystem.
Figure 2B:
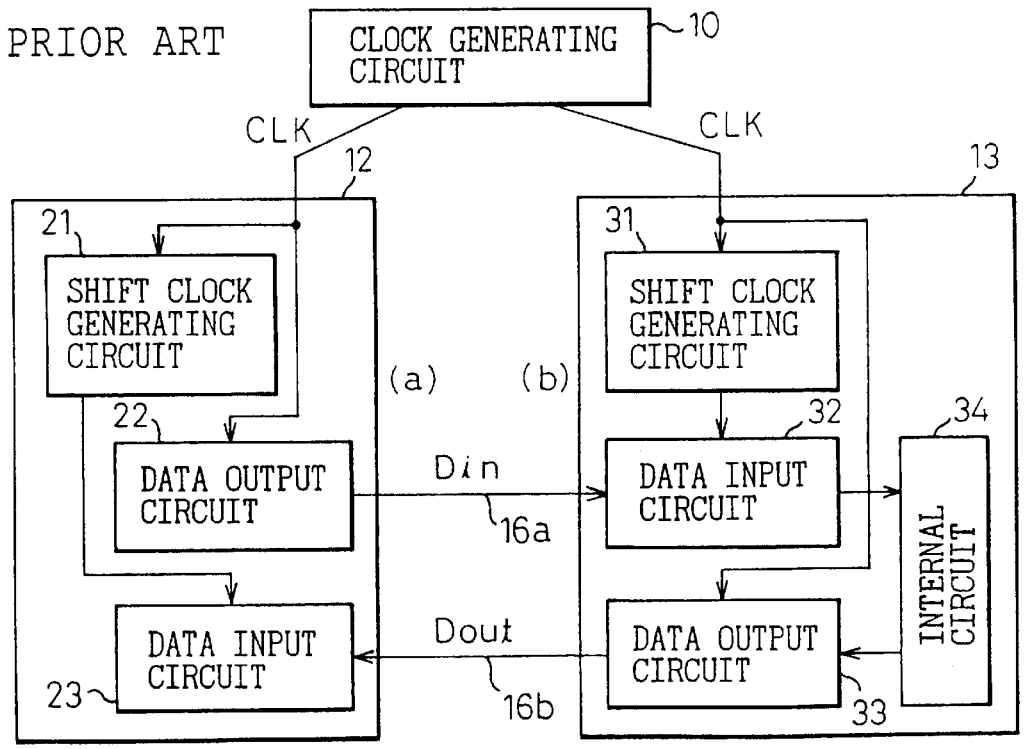

FIGS. 2A and 2B are diagrams showing a configuration of the system of FIG. 1 having a single memory, and the internal configuration of the controller 12 and the memory 13. Two configuration examples are shown in the present case. In the description that follows, the SDRAM of double data rate (DDR) type will be referred to, in which the minimum transition period of the data signal is one half of the clock period and the data changes in synchronism with both the leading edge and the trailing edge of the clock. The optimum timing for the data signal input circuit to retrieve the data signal is assumed to be shifted by one half of the minimum transition period from the change in the data signal, i.e., one-fourth (90°) of a clock period. The command signal and the address signal other than the data signal have a minimum transition period longer than that of the data signal, and therefore the timing of retrieving these signals is not a serious problem. The same configuration as the conventional one, therefore, is used for transmission of these signals, and will not be described below. Further, for facilitating the understanding, the data signal bus is divided into a write data bus 16a for transmitting the write data written in the memory 13 from the controller 12 and a read data bus 16b for transmitting the read data sent from the memory 13 to the controller 12. In spite of this, the write data and the read data can be transmitted through the same data bus.

In the configuration example shown in FIG. 2A, consider the case that data is written in the memory 13. A shift clock one fourth of a period out of phase with the clock CLK supplied by the clock generating circuit 10 is generated by a shift clock generating circuit 21, and the write data Din to be written in the memory 13 is output to the write data bus 16a in synchronism with the shift clock from the data output circuit 22. The memory causes the data input circuit 32 thereof to retrieve the write data Din in synchronism with the clock CLK. In reading data from the memory 13, on the other hand, the memory 13 causes the shift clock generating circuit 31 to generate a shift clock one fourth of a period out of phase with the clock CLK supplied by the clock generating circuit 10, and the read data Dout generated in the internal circuit 34 is output from the data output circuit 33 to the read data bus 16b in synchronism with the shift clock. The controller 12 causes the data input circuit 23 to retrieve the read data Dout in synchronism with the clock.

FIG. 3 is a time chart showing the data input/output operation in the configuration example shown in FIG. 2A.

Din and Dout with suffix "(a)" indicate the data on the controller 12 side, and Din and Dout with suffix "(b)" indicate the data on the memory 13 side in all the drawings described below. As shown, the write data Din(a) output from the controller 12 changes at a time point one fourth of a period out of phase with the transition edge of the clock CLK. Specifically, the transition edge of the clock CLK is located at the optimum timing of retrieving the write data Din(a). The write data Din(a) reaches the memory 13 after the lapse of the propagation time corresponding to the distance up to the memory 13 and then becomes the write data Din(b). The clock CLK supplied to the memory 13 is in phase with the clock CLK supplied to the controller 12. Therefore, the data input circuit 32 retrieves the write data Din at a timing'shifted by the time equivalent to the propagation time from the optimum timing.

When reading data from the memory 13, in contrast, a signal such as an address signal is transmitted from the controller 12 to the memory 13 in synchronism with the leading edge of the clock CLK. In response to this, the required process is executed in the memory 13, and after an access time tAC, the read data Dout(b) is output from the data output circuit 33 to the read data bus 16b. The read data Dout(b) reaches the controller 12 delayed by the above-mentioned propagation time and becomes Dout(a). The controller 12 causes the data input circuit 23 thereof to retrieve the read data Dout in synchronism with the next leading edge of the clock CLK.

In the configuration shown in FIG. 2A, the write data is retrieved using the clock CLK on the memory 13 side., and the read data is retrieved using the leading edge of the next clock on the controller side. The configuration, therefore, is very simple, and poses no problem as long as the clock frequency is sufficiently small so that the propagation time can be ignored and the data transmitted can be retrieved with a sufficient margin.

In the system of FIG. 2A, the output timing of the data signal is shifted at the transmission end for outputting the data signal to enable the data signal to be retrieved in synchronism with the clock edge at the receiving end. In spite of this, various modifications are possible. An example configuration is shown in FIG. 2B, in which the data signal is transmitted in synchronism with the clock edge, and received at a timing shifted from the clock edge. When data is written with the configuration of FIG. 2B, the controller 12 causes the data output circuit 22 thereof to output the write data in synchronism with the clock CLK, and the memory causes the data input circuit 32 thereof to retrieve the write data in synchronism with a shifted clock generated by the shift clock generating circuit 31. In reading the data, the memory 13 causes the data output circuit 33 to output the read data in synchronism with the clock CLK, and the controller 12 causes the data input circuit 23 to retrieve the read data in synchronism with the shifted clock generated by the shift clock generating circuit 31. Further, if the controller 12 is adapted to output the write data and retrieve the read data in synchronism with the shifted clock, the memory 13 can retrieve the write data and output the read data in synchronism with the clock CLK. Thus, the clock generating circuit can be incorporated only in the controller 12. Any way, a selected one or both of the controller 12 and the memory 13 are required to have a shift clock generating circuit.

As described above, in the case where the clock frequency is small, the deteriorated accuracy of the shift clock generating circuit 21 due to the signal variations is not a substantial problem, and a simple configuration can be used without any trouble. With the increase in clock frequency, however, the propagation time as compared with the clock period increases to such an extent that the deviation of the timing of retrieving the signal due to the propagation time comes to pose a problem. Another problem that arises is the displacement of the shift clock due to process variations and temperature changes in the shift clock generating circuit.

Figure 4:
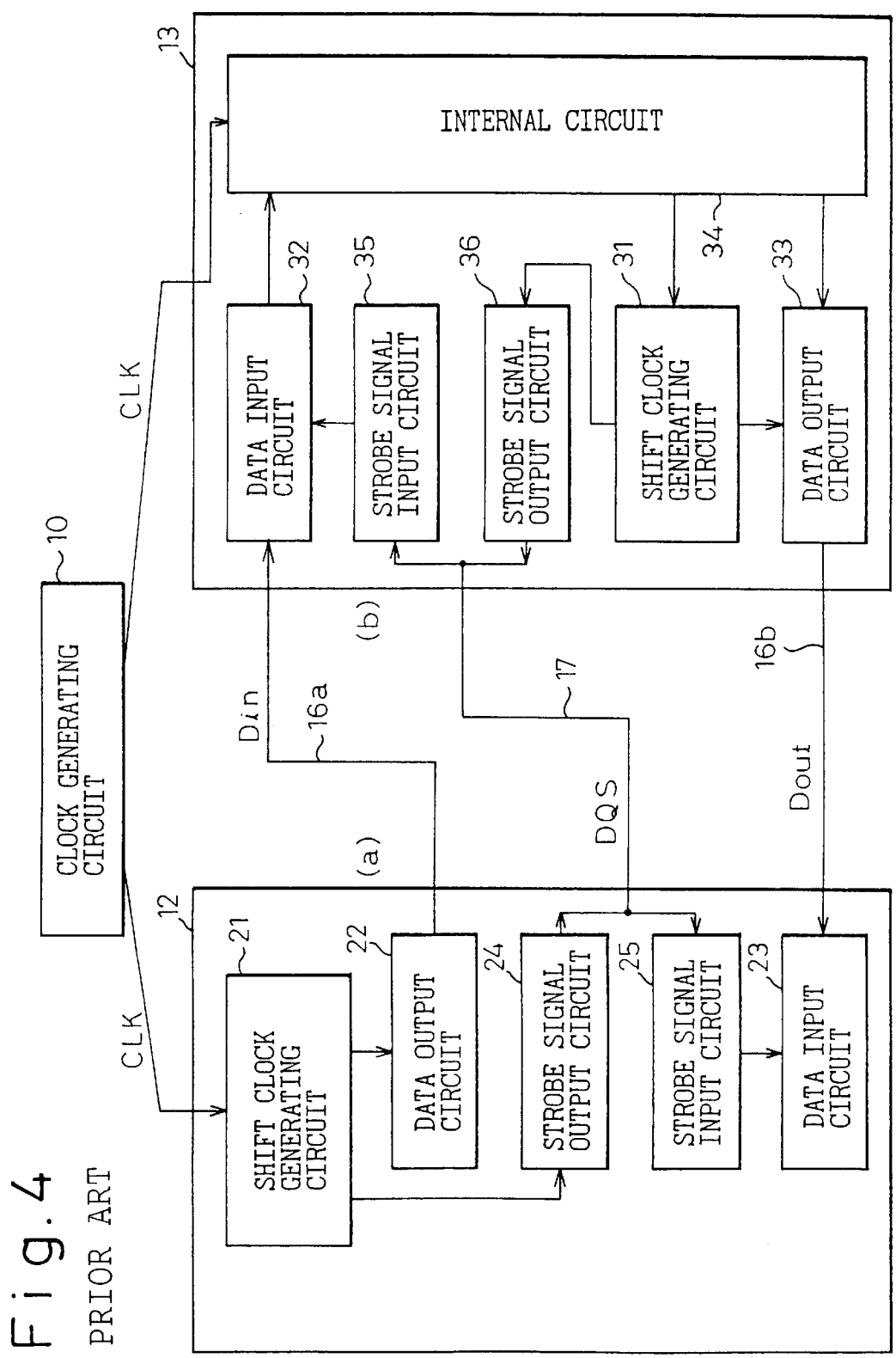
FIG. 4 is a diagram showing a system configuration for the bidirectional strobe scheme.

Several system configurations for securing high-speed operation have been proposed to solve these problems. FIG. 4 is a diagram showing an example of such a system configuration. The system of FIG. 4 transmits data using a data strobe signal DQS in addition to the basic clock CLK. In this system, what is called the bidirectional scheme is employed in which the data strobe signal DQS is used for transmitting both the write data Din and the read data Dout. The controller 12 includes a shift clock generating circuit.21 for generating two shift clocks one fourth of a period out of phase from the clock CLK, a data output circuit 22 for producing the write data Din in synchronism with one of the shift clocks CLK, a strobe signal output circuit 24 for producing the other shift clock, a strobe signal input circuit 25 for receiving the strobe signal transmitted from the memory 13, and a data input circuit 23 for retrieving the read data Dout transmitted from the memory 13 in synchronism with the strobe signal received by the strobe signal input circuit 25. The memory 13, on the other hand, includes a strobe signal input circuit 35 for receiving the strobe signal transmitted from the controller 12, a data input circuit 32 for retrieving the write data Din in synchronism with the strobe signal, a shift clock generating circuit 31 for generating two shift clocks one fourth of a period out of phase with the clock signal CLK and with one fourth of a period of a signal indicating the state in which the read data Dout generated by the internal circuit 34 can be produced, a data output circuit 33 for producing the read data Dout in synchronism with one of the shift clocks CLK, and a strobe signal output circuit 36 for producing the other shift clock. A write data bus 16a for transmitting the write data, a read data bus 16b for transmitting the read data and a strobe signal line 17 for transmitting the strobe signal are laid in parallel with an equal length to assure the same propagation time.

Figure 5:
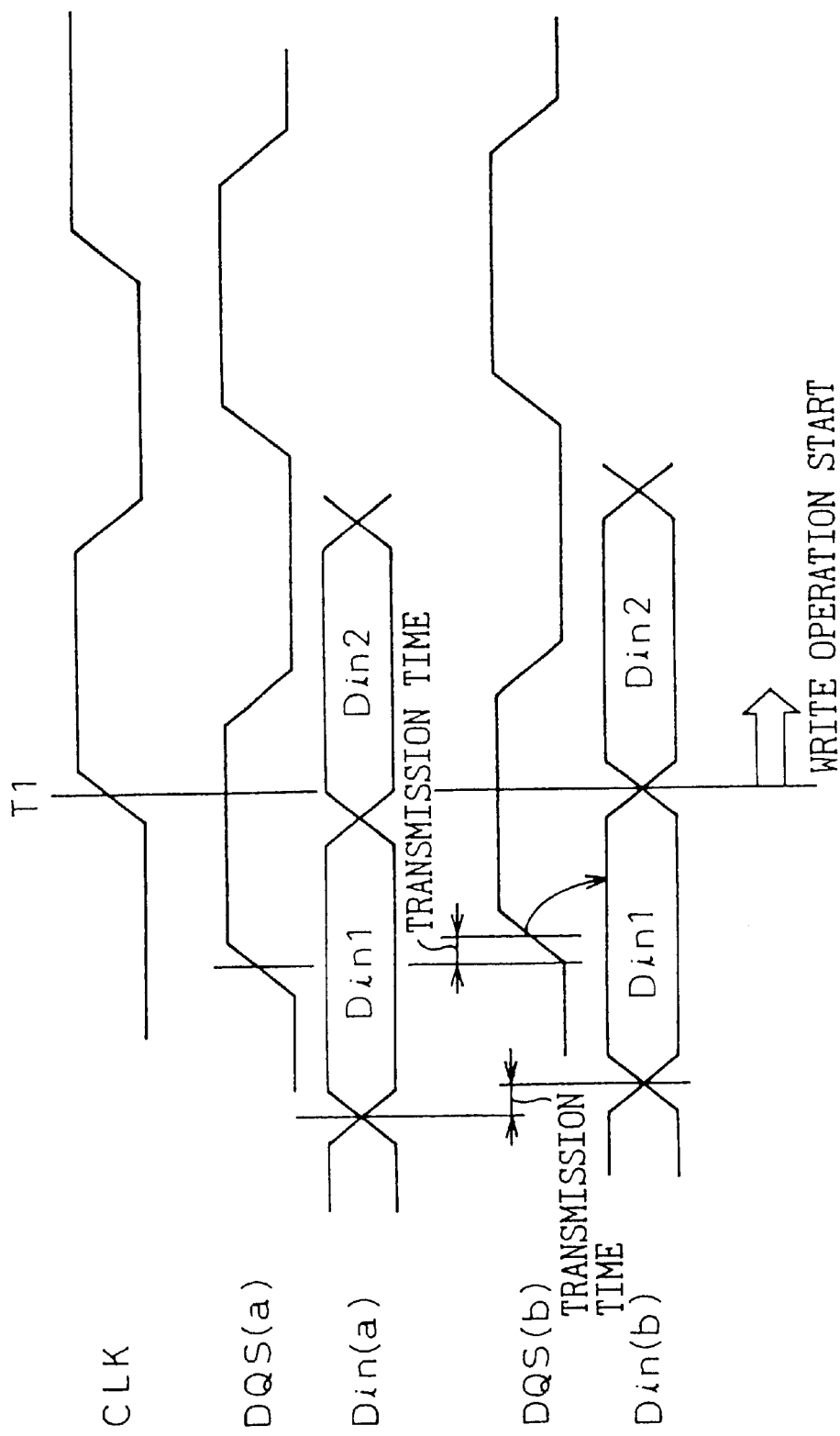
FIG. 5 is a time chart showing the write data transmission operation of a system for the bidirectional strobe scheme.

FIG. 5 is a time chart showing the write data transmission operation in the'system shown in FIG. 4. When transmitting the write data, the controller 12 outputs the write data Din(a) from the data output 30 circuit 22 and the data strobe signal DQS(a) from the strobe signal output circuit 24. As shown in FIG. 5, the write data Din(a) and the data strobe signal DQS(a) are one fourth of a period out of phase with each other. The transition edge of the data strobe signal DQS, therefore, represents an optimum timing for retrieving the write data Din., The data strobe signal DQS and the clock CLK have no predetermined phase relationship with each other. Even when the write data Din(a) and the data strobe signal DQS(a) are transmitted to the memory 13, the parallel arrangement of the write data bus 16a and the strobe signal line 17 substantially prevent a skew from being generated and the same phase relationship is held. As a result, the write data Din(b) and the data strobe signal DQS(b) in the memory 13 are delayed by a time equivalent to the transmission time from the write data Din(a) and the data strobe signal DQS(a), respectively. It is therefore possible for the data input circuit 32 of the memory 13 to retrieve the write data at an optimum timing in synchronism with the strobe signal received by the strobe signal input signal 35. The write data retrieved by the memory 13 begins to be written into the internal circuit 34 at the leading edge of the clock CLK after retrieval.

Figure 6:
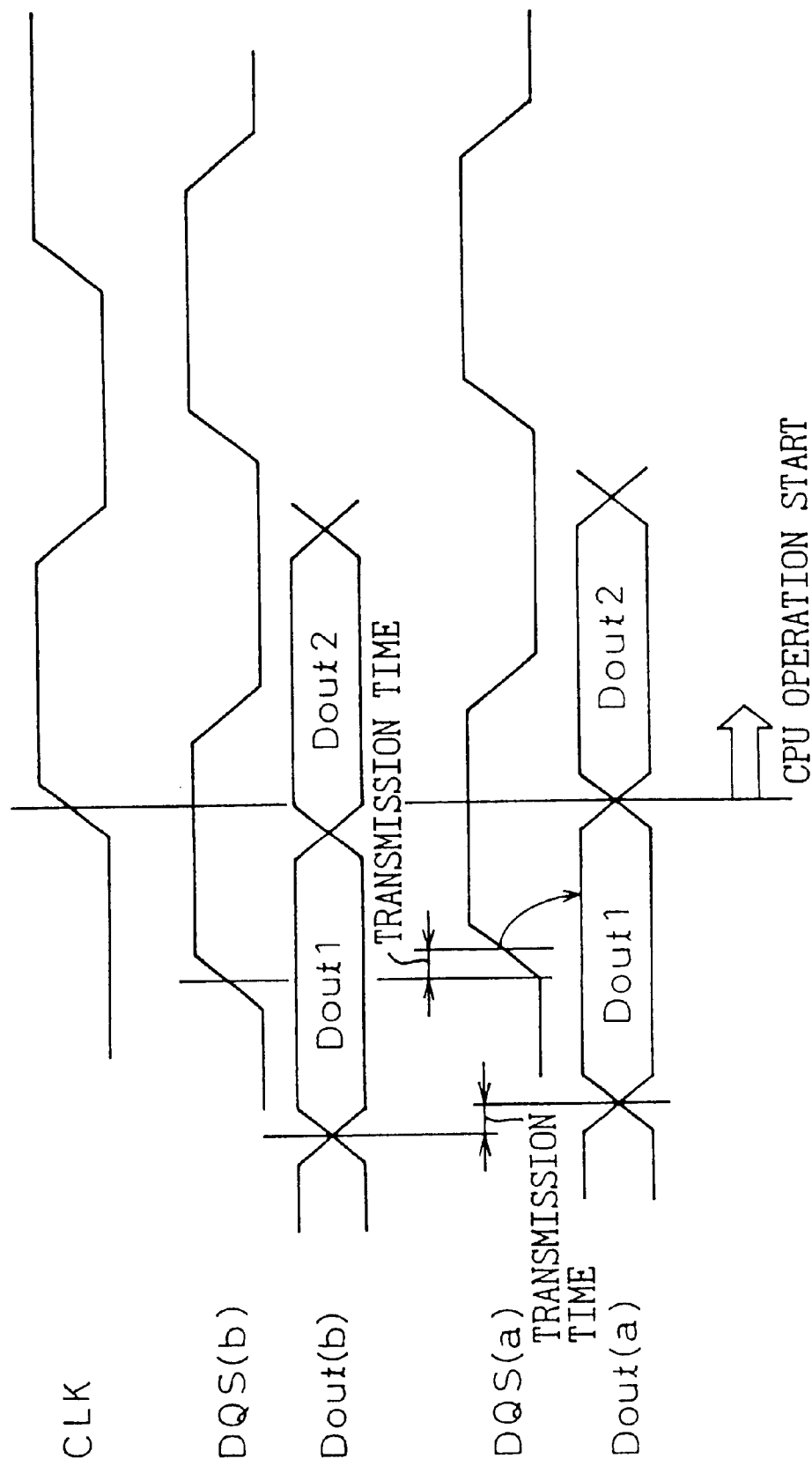
FIG. 6 is a time chart showing the read data transmission operation of a system for the bidirectional strobe scheme.

FIG. 6 is a time chart showing the read data transmission operation in the system of FIG. 4. When the read data is transmitted, the memory 13 causes the data output circuit 33 to produce the read data Dout(b) and causes the strobe signal output circuit 36 to produce the data strobe signal DQS(b). As shown in FIG. 6, the read data Dout(b) and the data strobe signal DQS(b) are one fourth of a period out of phase with each other. The transition edge of the data strobe signal DQS, therefore, represents an optimum timing for retrieving the read data Dout. The data strobe signal DQS and the clock CLK have no predetermined phase relationship with each other. Even when the read data Dout(b) and the data strobe signal DQS(b) are transmitted to the controller 12, the parallel arrangement of the read data signal line 16b and the data strobe signal line 17 produces substantially no skew and maintains the same phase relationship. Thus, the read data Dout(a) and the data strobe signal DQS(a) in the controller 12 are delayed by a time length equivalent to the transmission time from the read data Dout(b) and the data strobe signal DQS(b),-respectively. As a result, the data input circuit 23 of the controller 12 can retrieve the read data at an optimum timing in synchronism with the strobe signal received by the strobe signal input circuit 25. The read data retrieved by the controller 12 begins to be processed in the CPU at the leading edge of the clock CLK after the retrieval.

As described above, according to the bidirectional strobe scheme shown in FIG. 4, a strobe signal suitable for retrieval can be produced in the same direction as the data regardless of the direction in which the data are transmitted, and therefore the transmission data can always be retrieved at an optimum timing. As in the circuits of FIGS. 2A, 2B, however, the controller 12 and the memory 13 of the circuit shown in FIG. 4 are required to include a shift clock generating circuit for generating two shift clocks one fourth of a period out of phase. Further, a strobe signal line with an input circuit and an output circuit thereof are required for transmitting the strobe signal.

Figure 7:
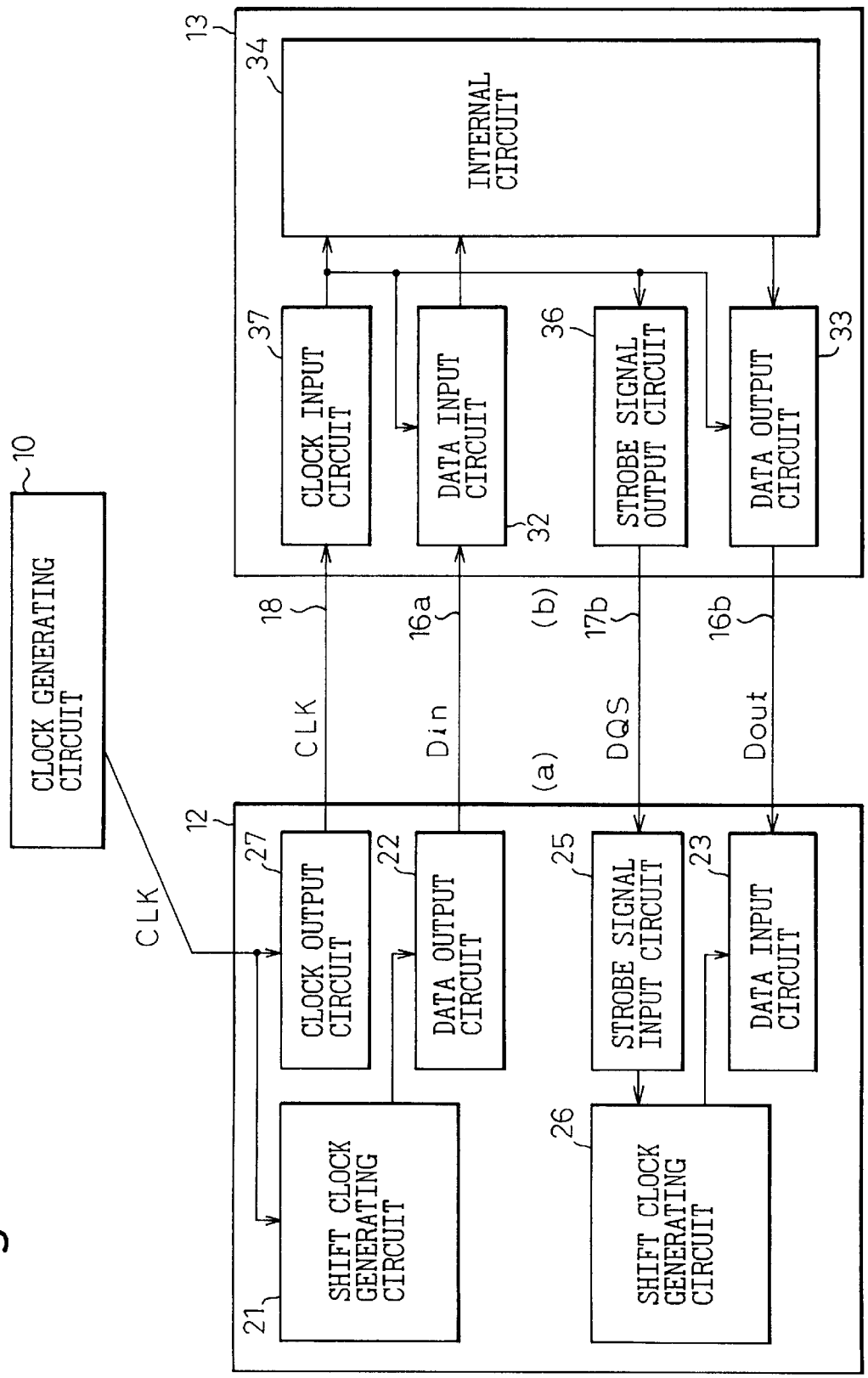
FIG. 7 is a diagram showing a conventional system configuration of the unidirectional strobe scheme.

FIG. 7 is a diagram showing another configuration example of the system for high-speed operation. In this system, the clock CLK is supplied from the controller 12 to the memory 13, and the clock signal line 18 for supplying the clock CLK is arranged in parallel to the write data bus 16a. The write data is transmitted from the controller 12 to the memory 13 in synchronism with a signal one fourth of a period out of phase with the clock CLK. The read data, on the other hand, is transmitted from the memory 13 to the controller 2 in synchronism with the data strobe signal DQS as in the system of FIG. 4, while at the same time transmitting the data strobe signal from the memory 13 to the controller 13. This scheme uses the data strobe signal DQS only for transmitting one of the data signals (the read data signal in the present case), and therefore is called the unidirectional scheme. The controller 12 includes a clock output circuit 27 for applying the received clock CLK to the clock signal line 18, a shift clock generating circuit 21 for generating a shift clock one fourth of a period out of phase from the clock CLK, a data output circuit 22 for outputting the write data Din in synchronism with the shift clock CLK, a strobe signal input circuit 25 for receiving the strobe signal sent from the memory 13, a shift clock generating circuit for generating a shift clock one fourth of a period out of phase with the strobe signal received by the strobe signal input circuit 25, and a data input circuit 23 for retrieving the read data Dout sent from the memory 13 in synchronism with the shift clock output from the shift clock generating circuit 26. The memory 13, on the other hand, includes a clock input circuit 32 for receiving the clock CLK sent from the controller 12, a data input circuit 32 for retrieving the write data Din in synchronism with the clock signal CLK, a data output circuit 33 for producing the read data Dout in synchronism with the clock CLK produced from the clock input circuit 37, and a strobe signal output circuit 36 for producing the clock CLK output from the clock input circuit 37 as a strobe signal. The clock signal line 18 for transmitting the clock CLK, the write data bus 16a for transmitting the write data; the read data bus 16b for transmitting the read data and the strobe signal line 17b for transmitting the strobe signal are arranged in parallel to each other with equal lengths of wire to assure the same propagation time.

Figure 8:
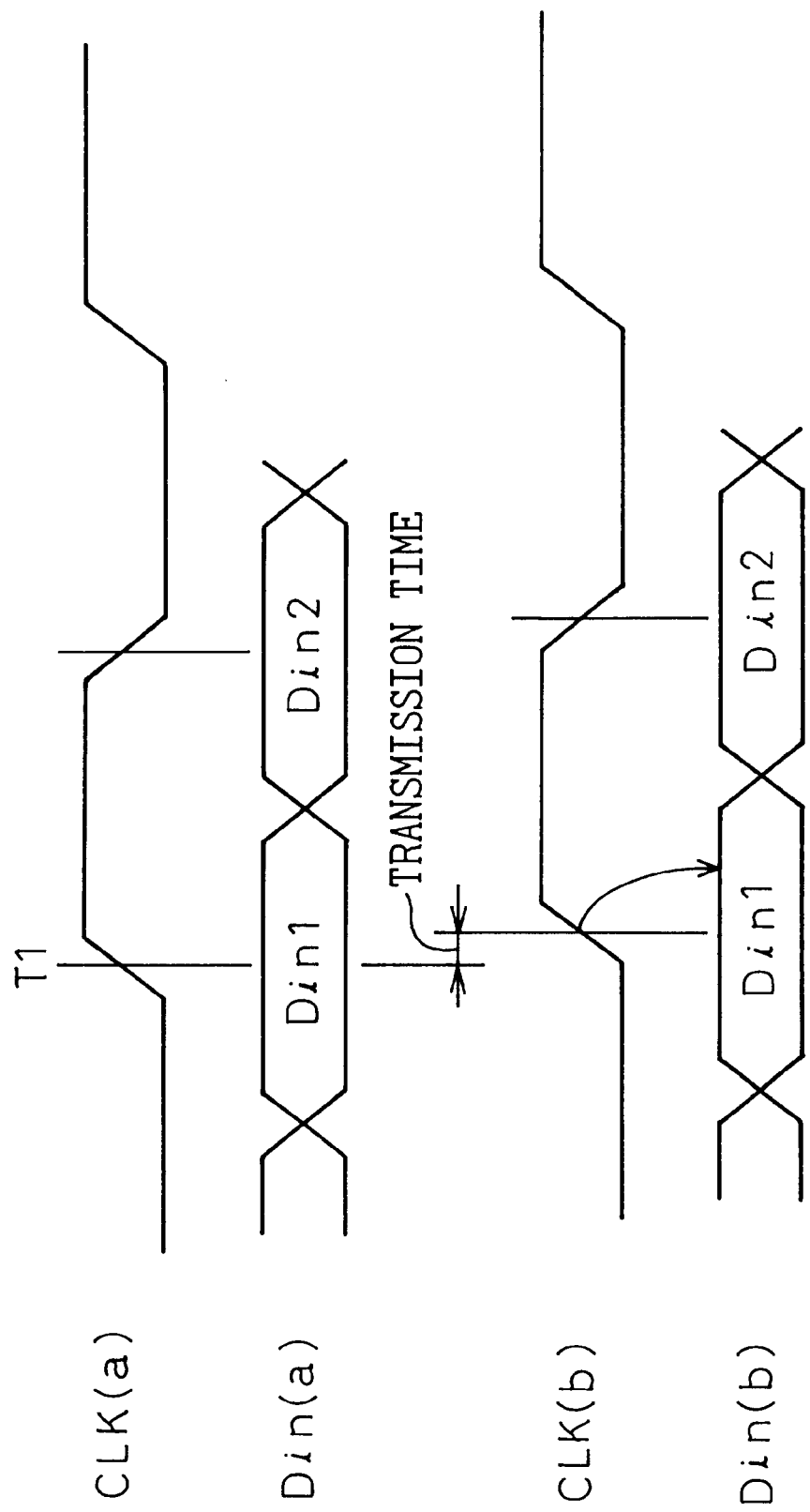
FIG. 8 is a time chart showing the write data transmission operation of a conventional system for the unidirectional strobe scheme.

FIG. 8 is a time chart showing the write data transmission operation in the system of FIG. 7. The controller 12 causes the clock output circuit 27 to produce the clock CLK constantly, and when transmitting the output write data, causes the data output circuit 22 to output the write data Din(a). As shown in FIG. 8, the write data Din(a) and the clock CLK are one fourth of a period out of phase with each other. As a result, the transition edge of the clock CLK represents an optimum timing for retrieving the write data Din. Even when the write data Din(a) and the clock CLK are transmitted to the memory 13, the parallel arrangement of-the write data signal line 16a and the clock- signal line 18 substantially suppresses the skew and maintains the prevailing phase relationship. Consequently, the write data Din(a) and the clock CLK(b) in the memory 13 are the signals representing the write data Din(a) and the clock CLK(-a), respectively, delayed by a time length equivalent to the transmission time. Thus, the data input circuit 32 of the memory 13 can retrieves the write data at an optimum timing in synchronism with the clock signal CLK received by the clock input circuit 37.

Figure 9:
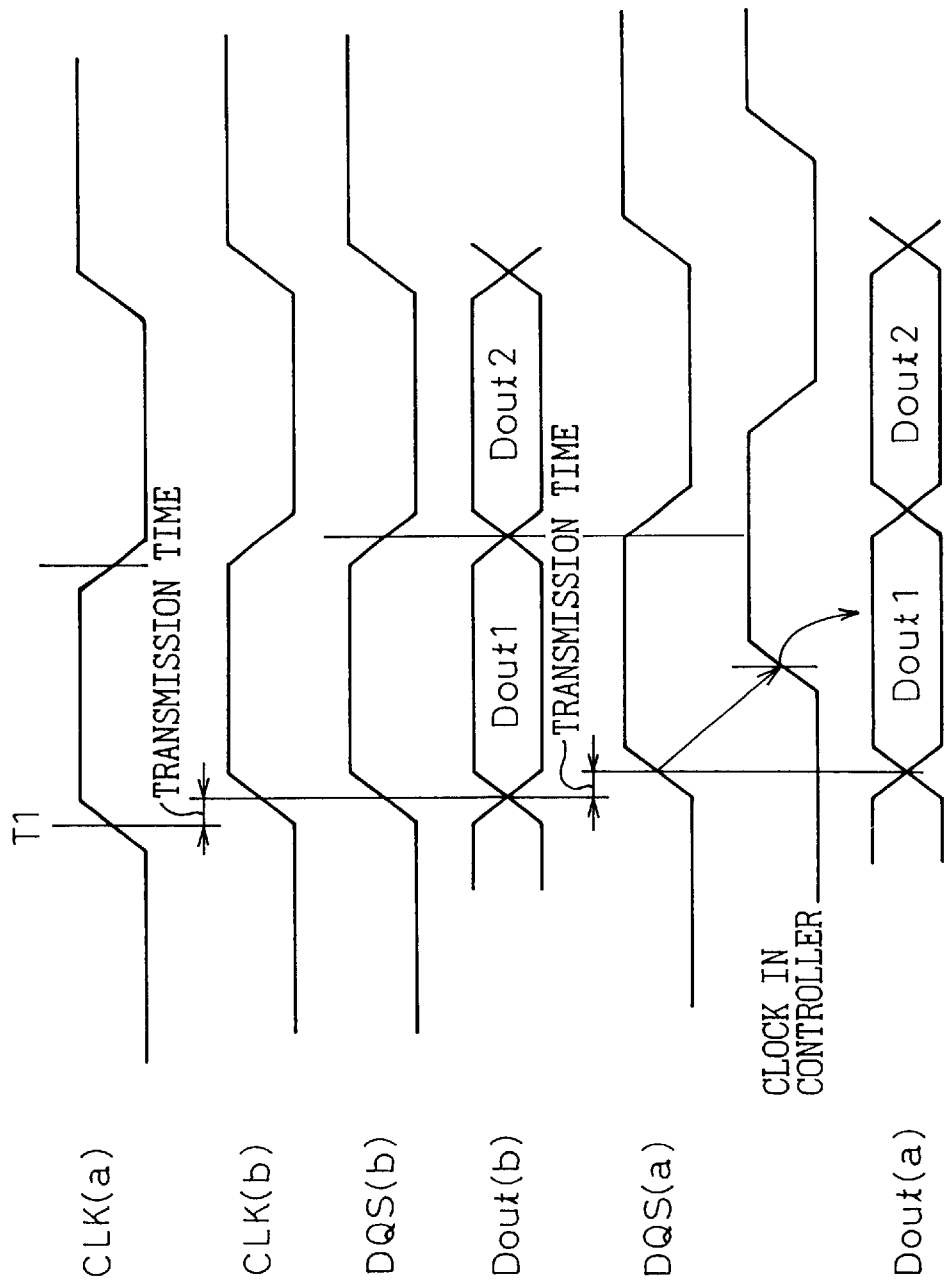
FIG. 9 is a time chart showing the read data transmission operation of a conventional system for the unidirectional strobe scheme.

FIG. 9 is a time chart showing the read data transmission operation in the system of FIG. 7. When transmitting the read data, the memory 13 causes the data output circuit 33 thereof to output the read data Dout(a) and the strobe signal output circuit 36 thereof to output the data strobe signal DQS(b). As shown in FIG. 9, the write data Dout(b) and the data strobe signal DQS(b) are out of phase with each other by one fourth of a period. The transition edge of the data strobe signal DQS, therefore, represents an optimum timing for retrieving the write data Dout. Even when the write data Dout(b) and the data strobe signal DQS(b) are transmitted to the controller 12, substantially no skew is generated and the prevailing phase relationship is maintained in view of the fact that the read data signal line 16b and the data strobe signal line 17 are arranged in parallel to each other. The read data Dout(a) and the data strobe signal DQS(a) in the controller 12, therefore, are delayed by a time length equivalent to the transmission time from the write data Dout(b) and the data strobe signal DQS(b), respectively. As a result, the write data can be retrieved by the data input circuit 23 of the controller 12 at an optimum timing in synchronism with the strobe signal received by the strobe signal input circuit 25.

As described above, in the unidirectional strobe scheme shown in FIG. 7, the transmission data can be retrieved always at an optimum timing regardless of the direction in which the data are transmitted.

In all the three conventional methods described above, it is necessary to generate a shift clock having a phase shifted by one half of the minimum transition period of the data signal. Specifically, if the minimum transition period of the data signal is identical to the period of the clock, a signal is required which is shifted one half of a period (180°) from a signal exactly in phase with the clock. Specifically, in the case of the DDR-SDRAM with a data signal having a minimum transition period equal to one half of the clock period and undergoing a transition at both the leading edge and the trailing edge of the clock, it is necessary to generate a shift clock zero period or one period (360°), one fourth of a period (90°), one half of a period (180°) and three fourths of a period (270°) out of phase. A DLL (delay locked loop) is used to generate a signal precisely shifted this way.

Figure 10:
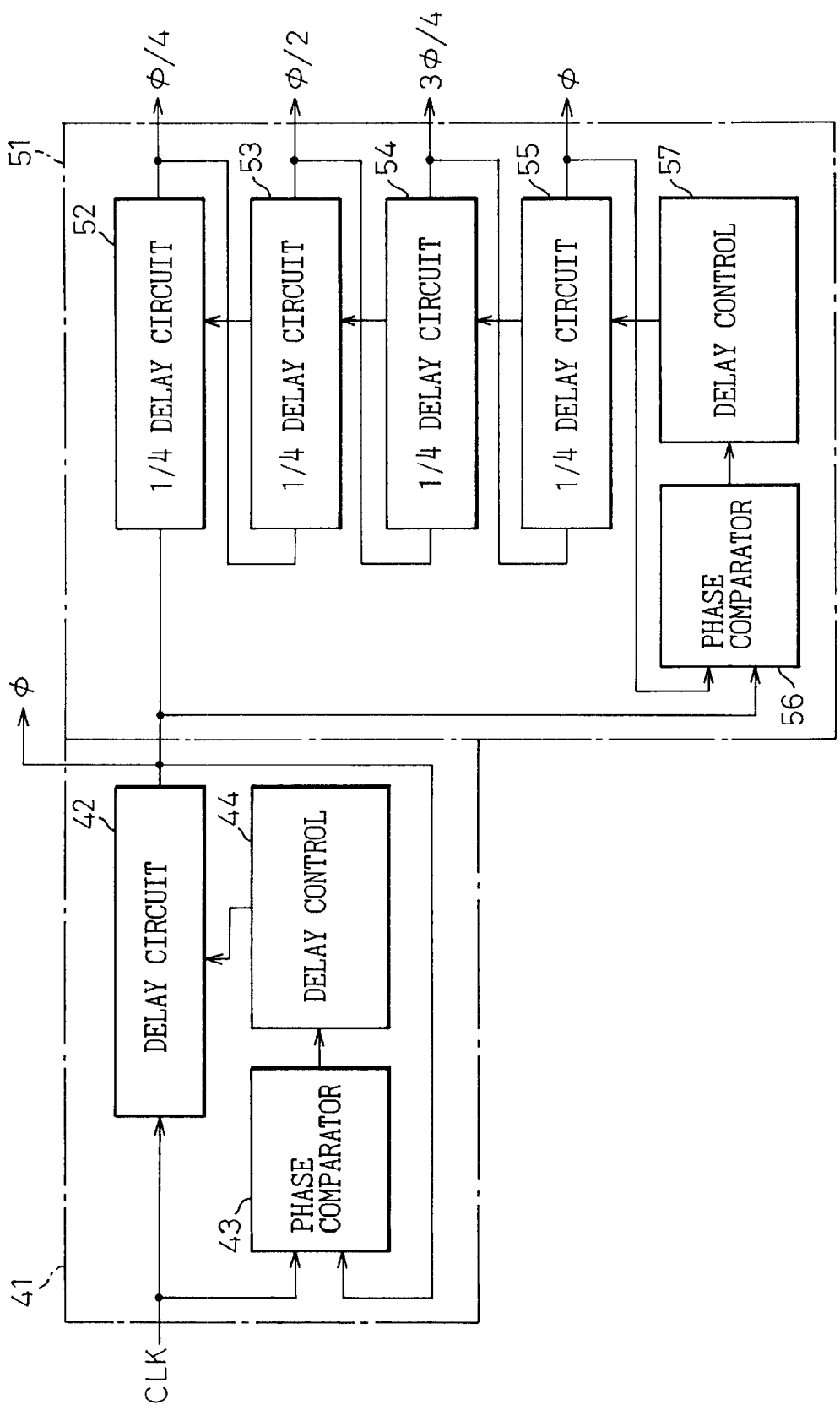
FIG. 10 is a diagram showing a configuration of a shift clock generating circuit using a DLL circuit.

FIG. 10 is a diagram showing a basic configuration of the DLL circuit for generating a shift clock in phase with (0°) the clock CLK and a shift clock one fourth of a period (90°) out of phase with the clock CLK. In FIG. 10, reference numeral 41 designates a DLL circuit for generating a shift clock 0° out of phase with the clock CLK, and numeral 51 a DLL circuit for generating four shift clocks progressively shifted by 90°.

The 0° DLL circuit 41 includes a delay circuit 42 capable of adjusting the amount of delay by delaying the clock CLK, a phase comparator circuit 43 for comparing the phase of the delayed clock output from the delay circuit 42 with that of the,clock CLK, and a delay control circuit 44 for changing the amount of delay by the delay circuit 42 in stages in such a manner that the phases of the two clocks coincide with each other on the basis of the result of comparison at the phase comparator circuit 43. In the case where the phase coincides between the delayed clock output from the delay circuit 42 and the clock CLK, the delayed clock output from the delay circuit 42 is a signal one period delayed from the clock CLK. The delay circuit 42 includes a multiplicity of series-connected delay elements each having a minute a amount of delay and a plurality of switches adapted to retrieve an output from each stage. The delay amount is changed depending on the switch operated and the stage from which the output is retrieved thereby.

The 90° DLL circuit 51, on the other hand, has the same configuration as the 0° DLL circuit for producing a 0° phase shift clock, except that the delay circuit is divided into four one-fourth delay circuit 52, 53, 54, 55 connected in series in such a manner that the output of a given stage is applied to the next stage. The delay control circuit 57 is for controlling each of the four one-fourth delay circuits in such a manner as to secure the same delay amount among them. The phase comparator circuit 56 compares the clock signal φ applied to the first one-fourth delay circuit 52 with the signal output from the last one-fourth delay circuit 55. The delay control circuit 57 controls the delay amounts of the four one-fourth delay circuits in such a manner that the phases of the two signals coincide with each other based on the result of comparison. In the case where the two signals are in phase with each other, the output of each one-fourth delay circuit is shifted one fourth of a period. In this way, shift clocks one fourth of a period delayed progressively among them are produced.

Signals out of phase with each other exactly by a predetermined amount can thus be obtained by using a DLL circuit. The DLL circuit, however, is very complicated and large in scale with a large chip size and a large power consumption.

In all the schemes described above, the controller and/or the memory includes a shift clock generating circuit for generating a signal one fourth of a period out of phase, for example, in order to retrieve the transmission data at an appropriate timing. For generating a signal shifted exactly by a predetermined amount, it is necessary to use a DLL circuit. In the case of the DDR-SDRAM, data are required to be transmitted and retrieved with reference to both the leading edge and trailing edge of a clock.

In the case where the duty factor of the clock supplied is exactly 50%, the leading edge and the trailing edge of the clock can be used in its direct form to generate signals one fourth of a period out of phase from the leading edge and the trailing edge thereof. The 90° DLL circuit 51 shown in FIG. 10 can thus be used.

In the case where the duty factor of the clock is displaced from 50%, in contrast, it is considered necessary-to generate a signal one half of a period (180° ) out of phase first, and then to generate a signal one fourth of a period out of phase with the particular signal. In such a case, however, two DLL circuits are required. The use of these DLL circuits twice would double the jitter of the DLL determined by the minimum change amount of the delay circuit-and leads to the problem of a deteriorated shift clock accuracy.

In view of this, the 90° DLL circuit 51 shown in FIG. 10 can be used to generate a signal one fourth of a period (90°) out of phase and a signal one half of a period (180°) out of phase. The 90° DLL circuit 51 shown in FIG. 10, however, includes DLL circuits connected in four stages and generates a jitter four times larger than the minimum change amount of each DLL circuit, also leading to the problem of a lower accuracy of the shift clock.

Another problem of the DLL circuit is that it is so complicated as described above that provision of this circuit in the controller or the memory increases the chip area to incur an increased cost and an increased power consumption.

FIG. 11A is a diagram showing a general configuration of a memory subsystem according to an embodiment of the present invention. As shown in FIG. 11A, the controller 12 of the memory subsystem according to this embodiment is supplied with a clock from a clock generating circuit 10. The clock signal line 18, the write data bus 16a, the read data bus 16b and the data strobe signal line 17b extend in parallel from the controller 12. The clock signal line 18 and the data strobe signal line 17b include extensions 71 and 72, respectively, for extending the signal lines and delaying the transmitted signal by a predetermined length of time. In addition, a control signal bus for transmitting a command signal and an address signal bus for transmitting an address signal are provided but not shown. The above-mentioned signal lines have sockets 61, through which memory modules 60a to 60c, called DIMM-SDRAMs, are connected. The DIMM-SDRAM, as shown in FIG. 11B, includes a plurality of memory elements (SDRAMs in the case under consideration) and further includes a decoder 64 and multiplexers 65a, 65b to assure operation of the memories elements combined as a large-capacity memory. A plurality of connection pins for connecting an external source are also incorporated. These pins located on the two sides of a module are independent of each other, and hence this device is called the dual in-line type. This DIMM-SDRAM can be replaced with equal effect by a memory module including a plurality of SDRAMs directly connected to the connection pins but lacking the decoder 64 and the multiplexers 65a, 65b, or by a unit of SDRAM itself. By way of simplicity, such a device is called hereinafter simply as a memory.

Each socket 61 is connected with a plurality of memories (DIMMS) forming a cluster. The difference in signal propagation time among the clusters is assumed to be negligibly small. If a multiplicity of clusters are connected, however, the resulting lengthened signal line poses the problem of a difference in propagation time. As described later, this embodiment is so configured that the transmission data can be retrieved at a satisfactory timing regardless of the memory position. Depending on the memory position, however, a difference occurs in the length of time from the time point when an access signal is output to each memory from the controller 12 to the time point when the read data is output from the memory and reaches the controller 12 at the time of reading the data. This difference, if not more than one clock cycle, would not present any problem, but if it is more than one clock cycle, it is liable to cause an operating error. In view of this, according to this embodiment, the number of clock cycles is counted for each memory cluster from the time point when an access is started to the time point when the read data reaches the controller 12 at the time of initialization of the memory subsystem, and the number thus counted is stored to enable the controller 12 to retrieve the read data at a correct timing. In such a case, if the time length from the time point when access is started to the time point when the read data arrives is approximately an integer multiple of the clock cycle, a change of this time length due to a change in the operating environment may cause the read data to be retrieved undesirably during an adjacent different clock cycle. In the case where the time required for access is approximately an integer multiple of the clock cycle, therefore, the access time is displaced from the neighborhood of an integer multiple of the clock cycle by a delay circuit 62.

Also, it is assumed that the clock generating circuit 10 generates a clock having a duty factor of exactly 50%, that the duty factor of the clocks supplied to the controller 12 and the memory 13 is also 50%, and that the data under the DDR scheme tan be output and retrieved at the leading edge and the trailing edge of the clock.

Figure 12:
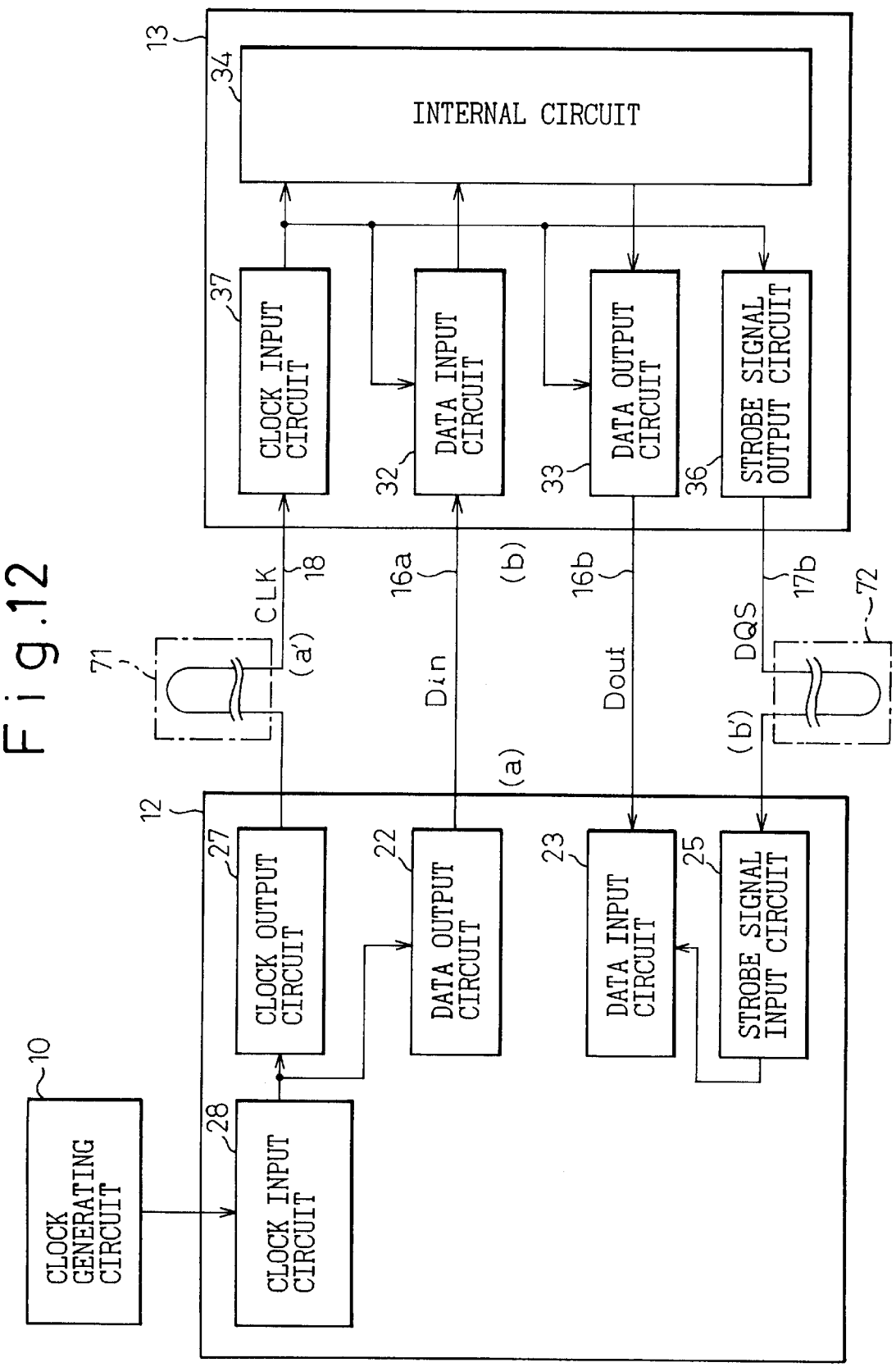
FIG. 12 is a diagram showing a basic configuration of the first embodiment.

FIG. 12 is a diagram showing the relation between a given one of the memories of the system of FIG. 11A and the controller 12 and the clock generating circuit 10, and shows an internal configuration of the controller 12 and the memory 13. As shown, in the system according to the first embodiment, the controller 12 including a clock input circuit 28 for receiving the clock output from the clock generating circuit, a clock output circuit 27 for applying the received clock CLK to the clock signal line 18, a data output circuit 22 for outputting the write data Din in synchronism with the clock CLK, a strobe signal input circuit 25 for receiving the strobe signal transmitted from the memory 13, and a data input circuit 23 for retrieving the read data Dout transmitted from the memory 13 in synchronism with the strobe signal received by the strobe signal input-circuit 25. The memory 13, on the other hand, includes a clock input circuit 37 for receiving the clock signal CLK sent from the controller 12, a data input circuit 32 for retrieving the write data Din in synchronism with the clock signal CLK, a data output circuit 33 for producing the read data Dout in synchronism with the clock CLK output from the clock input circuit 37, and a strobe signal output circuit 36 for producing the clock CLK output from the clock input circuit 37 as a strobe signal. The clock signal line 18 for transmitting the clock CLK, the write data bus 16a for transmitting the write data, the read data bus 16b for transmitting the read data and the strobe signal line 17b for transmitting the strobe signal are arranged in parallel to each other with an equal length of wire to assure the same propagation time. The clock signal line 18 and the strobe signal line 17b have extensions 71, 72, respectively, for delaying the clock signal and the data strobe signal by one fourth of the clock period, respectively. The extensions 71, 72 are simply for lengthening the clock signal line 18 and the strobe signal line 17, respectively, thereby to lengthen the time length of signal transmission therethrough. These delay circuits, as compared with the DLL circuit or the like, are less affected by temperature variations or the like and have a smaller error of the delay amount than the DLL circuit. Further, the clock signal line 18 and the strobe signal line 17 are matched in impedance with each other.

Figure 13:
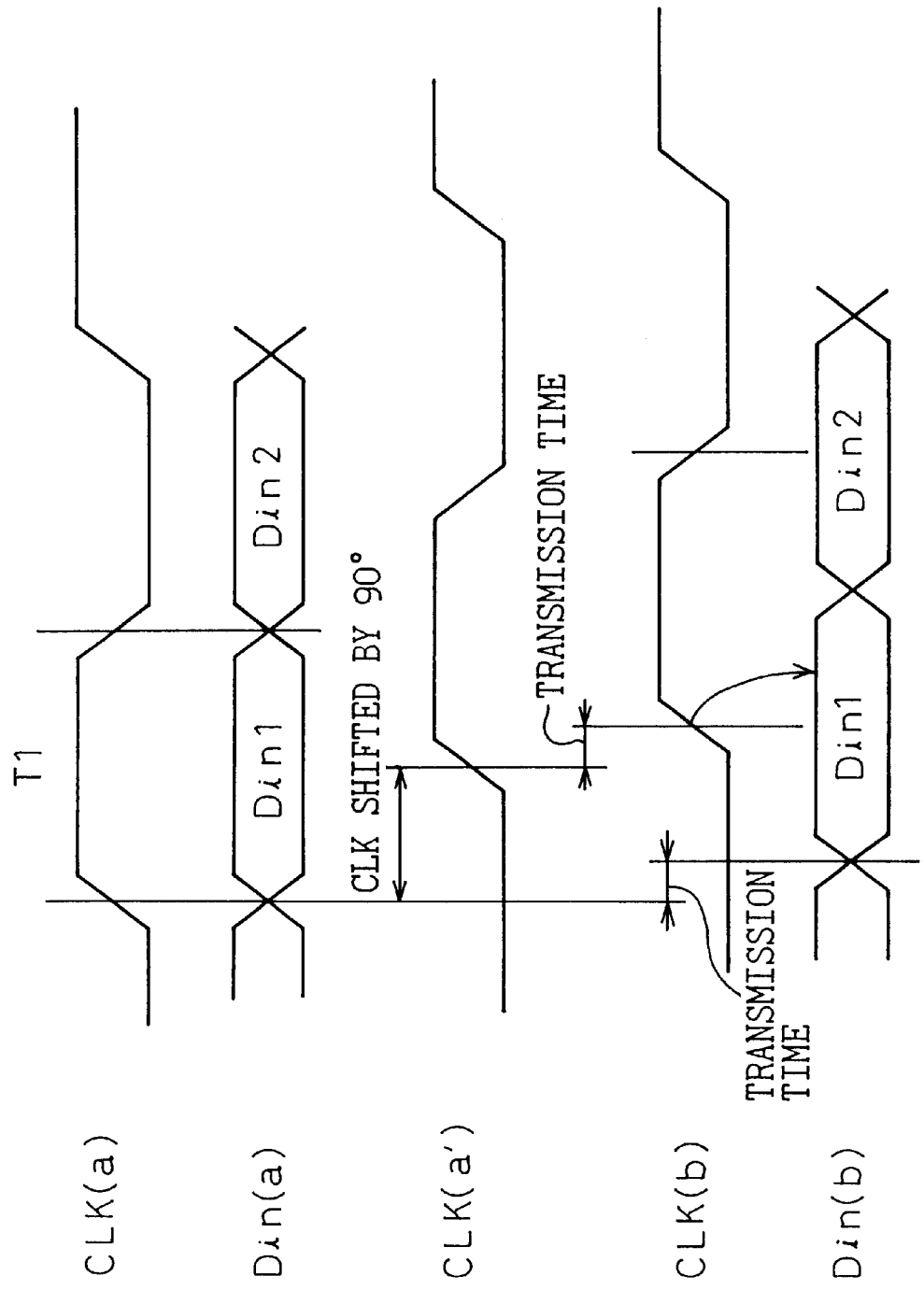
FIG. 13 is a time chart showing the write data transmission operation according to the first embodiment.

FIG. 13 is a time chart showing the write data transmission operation of the system according to the first embodiment shown in FIG. 12. The controller 12 causes the clock output circuit 27 thereof to output the clock CLK constantly, and when transmitting the output write data, causes the data output circuit 22 to produce the write data Din(a) in synchronism with the clock CLK. Since the DDR scheme is used, the write data Din(a) is changed in synchronism with both the leading edge and the trailing edge of the clock CLK. As a result, as shown in FIG. 13, the clock CLK(a) and the write data Din(a) output from the controller 12 are in phase with each other.

The clock CLK(a) and the write data Din(a) output from the controller 12 are transmitted through the clock signal line 18 and the write data bus 16a, respectively, to the memory 13. Since the clock signal line 18 includes the extension 71, the clock CLK(a) is delayed by one fourth of the clock period as it passes through the extension 71, and is transformed to a clock CLK(a') as shown. Thus the clock CLK(a') is a signal delayed one fourth of the clock period behind the write data Din(a). These signals are transmitted to the memory 13. As described above, the clock signal line 18 and the write data bus 16a are arranged in parallel to each other with an equal load. The difference in propagation time (skew) between them, therefore, can be substantially ignored. The clock CLK(b) and the write data Din(b) that have arrived at the memory 13, therefore, are one fourth of the clock period out of phase with each other as shown, and the transition edge of the clock CLK(b) represents an optimum timing for retrieving the write data Din(b). The data input circuit 32 thus can retrieve the write data Din(b) in synchronism with the clock CLK(b) retrieved by the clock input circuit 37.

Figure 14:
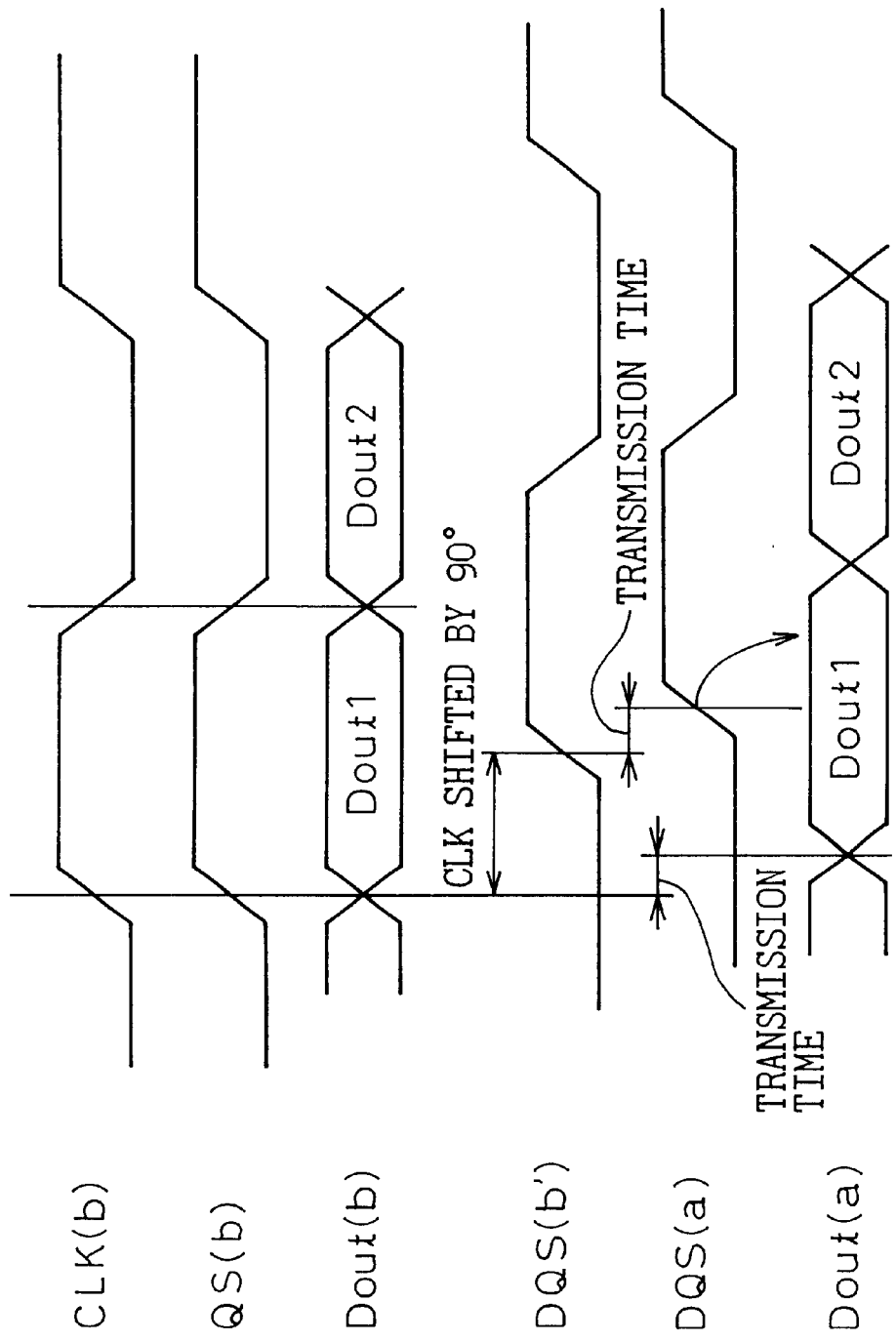
FIG. 14 is a time chart showing the read data transmission operation according to the first embodiment.

FIG. 14 is a time chart showing the read data transmission operation in a system according to the first embodiment shown in FIG. 12. When transmitting the read data, the memory 13 receives signals including a command and an address signal required for access from the controller 12, and reads the data Dout from the internal circuit 34. In response to this access signal, the SDRAM reads the data continuously. The memory 13 outputs the read data Dout from the data output circuit 33 in synchronism with the clock CLK sequentially from the first leading edge of the clock CLK after reading the read data Dout. At the same time, the clock CLK is output from the strobe signal output circuit 36. As a result, as shown in FIG. 14, the read data Dout(b) and the data strobe signal DQS(b) are in phase with each other.

The data strobe signal DQS(b) and the read data Dout(b) output from the memory 13 are transmitted through the data strobe signal line 17b and the read data bus 16b, respectively, to the controller 12. As described above, the data strobe signal line 17b and the read data bus 16b are arranged in parallel to each other and are set to have the same load, and therefore the difference in propagation time (skew) between them can be substantially ignored. Since the data strobe signal line 17b has the extension 72, however, the data strobe signal DQS(b) passing through this portion is delayed by one fourth of the clock period and becomes DQS(b') as shown. Thus, the data strobe signal DQS(b') is a signal delayed by one fourth of the clock period behind the read data Dout(b). These signals are transmitted to the controller 12. The data strobe signal DQS(a) and the read data Dout(a) that have reached the controller 12 are, therefore, one fourth of the clock period out of phase with each other as shown, so that the transition edge of the data strobe signal DQS(a) represents an optimum timing for retrieving the read data Dout(a). The data input circuit 23 thus can retrieve the read data Dout(a) in synchronism with the data strobe signal DQS(a) retrieved by the strobe signal input circuit 25.

As described above, according to the first embodiment, the transmission data being transmitted are changed in synchronism with the clock or the data strobe signal which are transmitted together with the transmission data, with the result that the phases of the clock and the data strobe signal are shifted to suit the retrieval of the data transmitted together with them. It is therefore not necessary to shift the phase of the clock or the data strobe signal in the controller or in the memory, thus eliminating the DLL circuit. In the case where the delay caused by the wiring and the internal load of the chip in supplying the received clock or the data strobe signal to the data input circuit cannot be ignored, the 0° DLL circuit can be used in order that the received clock or the data strobe signal are completely in phase with the signal supplied to the data input circuit. In such a case, the 0° DLL circuit has a smaller jitter than the 90° DLL circuit and offers no problem of deteriorated accuracy.

According to the first embodiment, extensions are formed between the controller 12 and the memory cluster for delaying the clock signal and the data strobe signal. The signal proceeds at a rate of about 30 cm per ns. If the clock frequency is 250 MHz, for example, the one fourth of the clock period is one ns, so that each extension is required to have a two-way length of 15 cm. In view of the fact that the controller and the memory cluster are arranged densely with each other, such a space may be difficult to secure between the controller and the memory cluster. The second embodiment is intended to meet such a requirement.

Figure 15A:
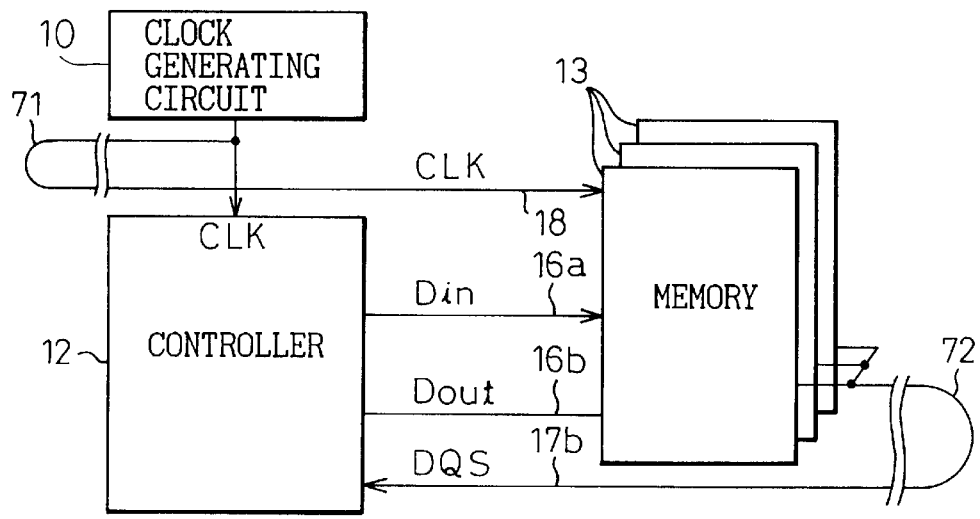
FIGS. 15A, 15B are diagrams showing a configuration of a memory subsystem according to a second embodiment of the present invention.
Figure 15B:
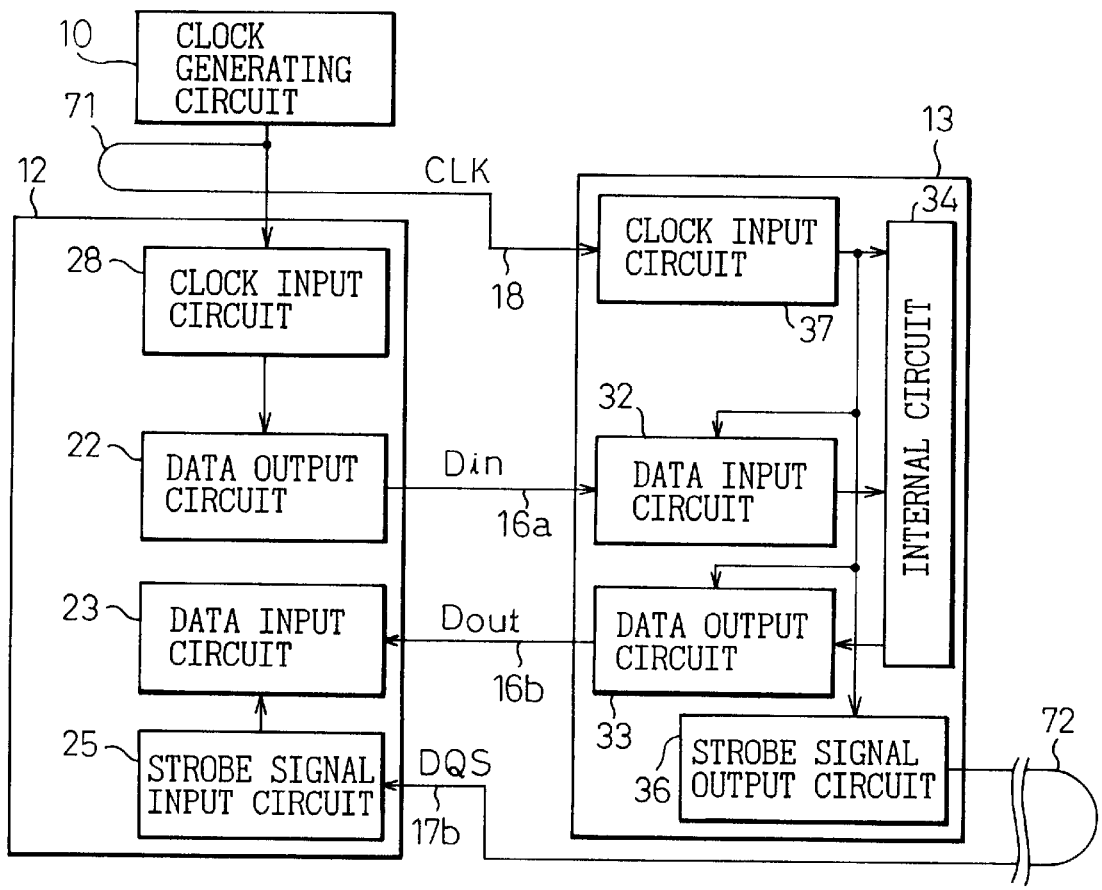

FIGS. 15A, 15B are diagrams showing a configuration of a memory subsystem according to the second embodiment. FIG. 15A shows a general configuration, and FIG. 15B a basic configuration. As apparent in comparison with the first embodiment, the system according to the second embodiment has a similar configuration to the first embodiment, the only difference being that in the second embodiment the extension 71 of the clock signal line 18 is arranged outside the controller 12 and the extension 72 of the data strobe signal line 17b is disposed outside the memory cluster. A signal line is also provided for supplying a clock from the clock generating circuit 10 to the controller 12. This signal line is branched midway and connected to an end of the extension 71 arranged outside the controller 12. The other end of the extension 71 is connected to the clock signal line 18. The data strobe signal lines from the memories are collected by cluster, and then are connected to the data strobe signal line 17b connected to the controller 12. In the case where a plurality of memory clusters are provided as shown in FIG. 11A, for example, an extension 72 is formed for each memory cluster, and the data strobe signal lines are collected for each memory cluster, after which they are connected through the corresponding extension 72 to the data strobe signal line 17b connected to the controller 12.

According to the first and second embodiments, the memory 13 outputs the received clock CLK as a data strobe signal. The clock that has arrived at the memory 13, therefore, can be returned directly as a data strobe signal. In the third embodiment, the clock CLK is returned as the data strobe signal.

Figure 16:
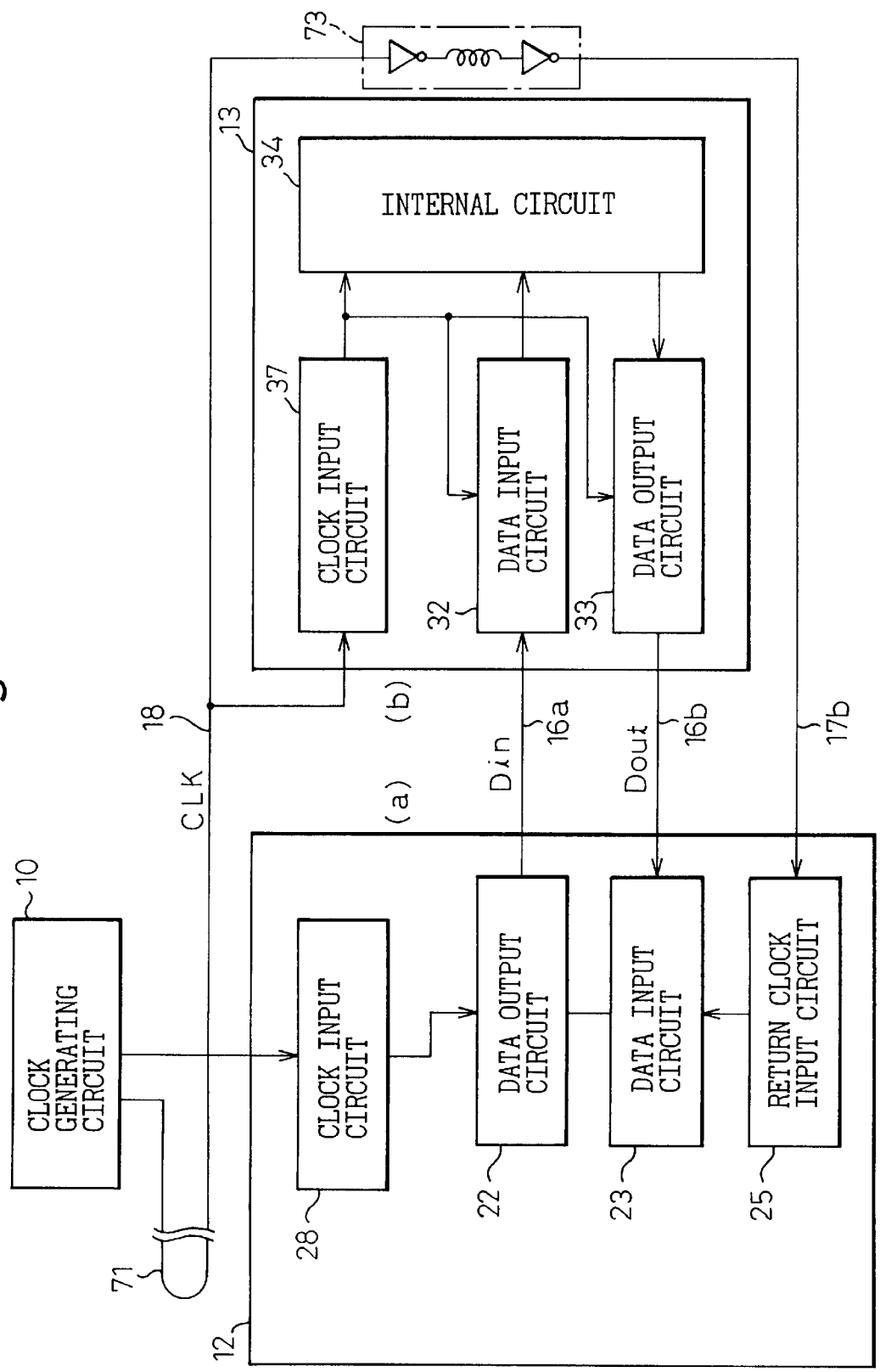
FIG. 16 is a diagram showing a configuration of a memory subsystem according to a third embodiment of the invention.

FIG. 16 is a diagram showing a configuration of a memory subsystem according to the third embodiment. As shown, this embodiment has a similar configuration to the system of the second embodiment, except that in this embodiment the clock signal line 18 is connected to the strobe signal line 17b in the memory 13 and a delay circuit 73 including a coil is inserted as a connector and that the memory 13 is not provided with the strobe signal output circuit. The delay circuit 73 is a widely-used delay line, and includes a coil and two inverters connected on both sides thereof. By setting the coil inductance to an appropriate value, the signal that passes therethrough can be delayed by a predetermined amount.

FIGS. 17 and 18 are time charts showing the operation of transmitting the write data and the read data, respectively, in the system according to the third embodiment. The specific operation is substantially identical to that of the first embodiment and will not be described in detail.

The foregoing description concerns a case in which the duty factor of the clock is 50% and the data can be output and retrieved at the leading edge and the trailing edge of the clock. In the case where the duty factor of the clock is displaced from 50%, however, a 180° DLL circuit is required for the controller and the memory, respectively. Even in such a case, it is not necessary to generate a signal one fourth of the clock period out of phase. The 180° DLL circuit can be realized by two stages of the delay circuit in the 90° DLL circuit 51 and has one half of the jitter as compared with the 90° DLL circuit.

The present invention is described above with reference to embodiments applied to the unidirectional strobe scheme shown in FIG. 7. Nevertheless, the present invention is also applicable to any configuration using a signal line for transmitting the sync signal in one direction.

It will thus be understood from the foregoing description that according to this invention, the clock signal line and the data strobe signal line include an extension or a delay circuit like a delay line, whereby data can be retrieved at a proper timing without any DLL circuit in the controller or in the memory, or with a minimum number of DLL circuits or with a minimum number of stages of DLL circuits, if required. Consequently, no jitter occurs, or any jitter that may occur can be minimized.

What is claimed is:

1. A memory subsystem comprising:

a controller including an output circuit for outputting a read command, and a read data input circuit for retrieving read data;

a plurality of memory devices each including a command input circuit for retrieving said read command, and a read data output circuit for outputting said read data which is read from said memory device in response to said read command;

a clock or data strobe line connected between said controller and said plurality of memory devices; and a data line connected between said controller and said plurality of memory devices to transfer said read data, wherein in an initializing operation, said controller counts and stores a number of cycles of a clock signal as an access time from a time point when said controller outputs said read command to the time point when said controller retrieves said read data from said memory device to enable said controller to retrieve said read data at a correct timing; and said memory subsystem further comprising at least one delay circuit arranged on said clock or data strobe line, between said controller and a selected one of said plurality of memory devices or between said memory devices, a delay amount of said at least one delay circuit being determined so that said access time is displaced from a value approximately equal to an integer multiple of the cycle of said clock signal.

2. A memory subsystem according to claim 1, wherein
said controller includes a write data output circuit for outputting write data so as to change said write data at a transition edge of a clock signal,
each memory device includes a write data input circuit for retrieving said data in response to an adjusted clock signal,
said read data output circuit outputs said read data so as to change said read data at a transition edge of a strobe signal, and
said read data input circuit retrieves said read data in response to an adjusted strobe signal,
said subsystem further comprising:
a clock delay circuit, disposed outside of said controller and said plurality of memory devices, receiving said clock signal to output said adjusted clock signal such that said write data input circuit of each memory device retrieves said write data at a transition edge of said adjusted clock signal; and;
a data strobe delay circuit, disposed outside of said controller and said plurality of memory devices, receiving said strobe signal to output said adjusted strobe signal such that said read data input circuit of said controller retrieves said read data at a transition edge of said adjusted strobe signal.

3. A memory subsystem according to claim 2, wherein a phase difference between said clock signal and said adjusted clock signal and a phase difference between said strobe signal and said adjusted strobe signal are equal to one half of a minimum transition period of said write and read data.

4. A memory subsystem according to claim 2, wherein said clock delay circuit and said data strobe delay circuit respectively have long wiring for lengthening the propagation time of said clock signal and said strobe signal.

5. A memory subsystem according to claim 2, wherein said clock delay circuit and said data strobe delay circuit are a delay line using a delay element.

6. A memory subsystem according to claim 2, wherein clock signal lines on which said clock signal and said adjusted clock signal are transmitted and data strobe signal lines on which said data strobe signal and said adjusted data strobe signal are transmitted are respectively matched in impedance with each other.

7. A memory subsystem according to claim 2, wherein said clock delay circuit and said data strobe delay circuit are interposed in a space between said controller and said plurality of memory devices.

8. A memory subsystem according to claim 2, wherein said clock delay circuit and said data strobe delay circuit are disposed outside a space between said controller and said plurality of memory devices.

9. A memory subsystem according to claim 2, further comprising a clock signal line extending from said controller to said plurality of memory devices, wherein said clock delay circuit is disposed on said clock signal line, said controller outputs said clock signal to said clock signal line, and said adjusted clock signal is transmitted from said clock delay circuit to said memory device on said clock signal line.

10. A memory subsystem according to claim 2, comprising:
a clock source for supplying said clock signal;
a signal line for supplying said clock signal from said clock source to said controller; and
a clock signal line branched from said signal line,
wherein said clock signal line extends to said plurality of memory devices, said clock delay circuit is disposed on said clock signal line, and said adjusted clock signal is transmitted from said clock delay circuit to said plurality of memory devices on said clock signal line.

11. A memory subsystem according to claim 2, comprising:
a clock signal line arranged in parallel to a data signal line for transmitting said clock signal to said plurality of memory devices;
a clock source for supplying said clock signal;
a first signal line for supplying said clock signal from said clock source to said controller; and
a second signal line for supplying said clock signal from said clock source to said clock signal line,
wherein said clock delay circuit is disposed on said clock signal line, said adjusted clock signal is transmitted from said clock delay circuit to said plurality of memory devices on said clock signal line, and said first and second signal lines are arranged in parallel to each other.

12. A memory subsystem according to claim 2, wherein said data strobe signal is said adjusted clock signal received by said plurality of memory devices, said memory device changes said read data at a transition edge of said received adjusted clock signal when transmitting said read data to said controller, a data strobe signal line on which said data strobe signal is transmitted is connected to a clock signal line on which said adjusted clock signal is transmitted in the neighborhood of each memory device, and said data strobe delay circuit is arranged at said connection of said data strobe signal line and said clock signal line.

13. A memory subsystem according to claim 2, further comprising:
a clock source for supplying said clock signal;
data signal lines for transmitting said write and read data between said controller and said plurality of memory devices;
a clock signal line arranged in parallel to said data signal lines for transmitting said adjusted clock signal to said plurality of memory devices; and
a data strobe signal line arranged in parallel to said data signal lines for transmitting said adjusted data strobe signal to said controller,
wherein said clock signal line includes said clock delay circuit, said data strobe signal line includes said data strobe delay circuit, said clock signal is supplied to said clock delay circuit via said clock signal line, and said data strobe signal is supplied to said strobe delay circuit via said data strobe signal line.

14. A memory subsystem according to claim 1, wherein
said read data input circuit of said controller retrieves said read data in response to an adjusted strobe signal, and wherein
each memory device outputs said read data so as to change said read data at a transition edge of a strobe signal,
said subsystem further comprising:
a data strobe delay circuit, disposed outside of said controller and said plurality of memory devices, receiving said strobe signal to output said adjusted strobe signal such that said read data input circuit of said controller retrieves said read data at a transition edge of said adjusted strobe signal.

15. A memory subsystem comprising:

a controller outputting a read command to retrieve read data; and a plurality of memory devices each retrieving said read command to output said read data in response to said read command;

a clock or data strobe line connected between said controller and said plurality of memory devices; and a data line connected between said controller and said plurality of memory devices to transfer said read data, wherein in an initializing operation, said controller counts and stores a number of cycles of a clock signal as an access time from a time point when said controller outputs said read command to the time point when said controller retrieves said read data from each said memory device, to enable said controller to retrieve said read data at a correct timing;

said memory subsystem further comprising a delay circuit arranged on said clock or data strobe line and said data line between said controller and a selected one of said plurality of memory devices, said delay circuit having a delay time such that said access time is displaced from a value approximately equal to an integer multiple of the cycle of said clock signal.

16. A memory subsystem according to claim 15, wherein said controller includes a write data output circuit for outputting a write data so as to change said write data at a transition edge of a clock signal;

said subsystem further comprising:

a memory device including a write data input circuit for retrieving said write data in response to an adjusted clock signal; and a clock delay circuit, disposed outside of said controller and said plurality of memory devices, receiving said clock signal to output said adjusted clock signal such that said write data input circuit of each memory device retrieves said write data at a transition edge of said adjusted clocks signal.

\* \* \* \* \*